(12) United States Patent
French

(10) Patent No.: US 8,844,583 B2
(45) Date of Patent: Sep. 30, 2014

(54) REFUEL VALVE ASSEMBLY AND METHOD FOR REFUELLING AN AIRCRAFT

(75) Inventor: Clive French, Nottingham (GB)

(73) Assignee: Airbus Operations Limited, Bristol (GB)

( * ) Notice: Subject to any disclaimer, the term of this patent is extended or adjusted under 35 U.S.C. 154(b) by 189 days.

(21) Appl. No.: 13/137,095

(22) Filed: Jul. 20, 2011

(65) Prior Publication Data

US 2012/0024418 A1 Feb. 2, 2012

(30) Foreign Application Priority Data

Jul. 29, 2010 (GB) .................................. 1012730.6

(51) Int. Cl.
*B65B 1/30* (2006.01)
*B64D 37/00* (2006.01)

(52) U.S. Cl.
CPC ............... *B64D 37/005* (2013.01); *Y02T 50/44* (2013.01)
USPC ............... 141/5; 141/198; 141/244; 141/302; 244/135 A; 244/135 R; 137/899.2; 137/266

(58) Field of Classification Search
USPC ......... 141/113, 197–198, 206, 234, 237, 242, 141/244, 285, 301–302, 305, 4–5; 244/135 A, 135 R; 137/255, 266, 899.2
See application file for complete search history.

(56) References Cited

U.S. PATENT DOCUMENTS

| 2,771,090 | A | * | 11/1956 | Smith et al. | 137/390 |
| 3,383,078 | A | * | 5/1968 | Shohet et al. | 244/135 R |
| 5,321,945 | A | | 6/1994 | Bell | |
| 8,313,061 | B2 | * | 11/2012 | Surawski | 244/129.2 |
| 8,381,779 | B1 | * | 2/2013 | Wyler | 141/94 |
| 2007/0084511 | A1 | | 4/2007 | Johnson et al. | |

FOREIGN PATENT DOCUMENTS

| EP | 1 731 422 | | 12/2006 | | |
| RU | 2 053 934 | | 2/1996 | | |
| WO | WO 2012013957 | A1 | * | 2/2012 | 141/192 |

OTHER PUBLICATIONS

UK Search Report dated Nov. 18, 2010 GB 1012730.6.

* cited by examiner

*Primary Examiner* — Timothy L Maust
*Assistant Examiner* — Timothy P Kelly
(74) *Attorney, Agent, or Firm* — Nixon & Vanderhye P.C.

(57) ABSTRACT

The invention provides a refuel valve assembly 240 for refuelling a first and a second fuel tank on an aircraft, wherein the refuel valve assembly 240 comprises an inlet for receiving fuel from an orifice 215 in a structure 213 of the aircraft, a first 251*a* and a second outlet 251*b* for delivering fuel from behind the structure to the first 211*a* and second 211*b* fuel tanks, and a refuel control apparatus for controlling fuel flow to the first and second outlets; wherein the refuel control apparatus includes a controllable valve assembly, so that delivery of fuel through the first outlet to a first fuel tank can be controlled independently of delivery through the second outlet of fuel to a second fuel tank. The invention also provides a method of refuelling a first and a second fuel tank on an aircraft.

27 Claims, 16 Drawing Sheets

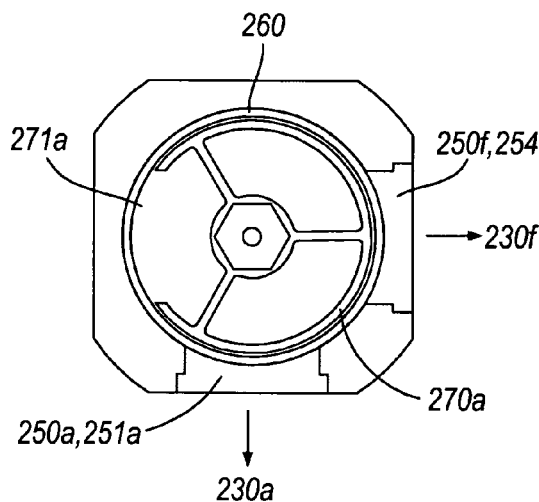
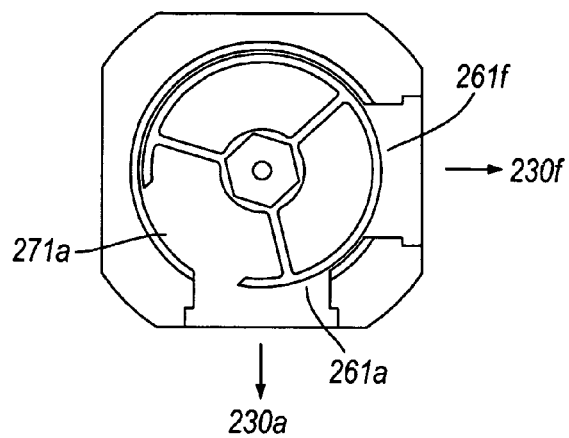
Fig.8a
Fig.8b
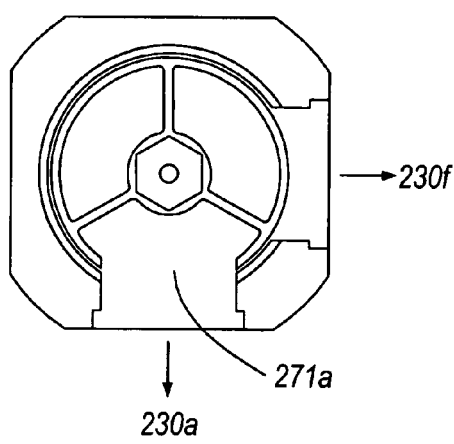
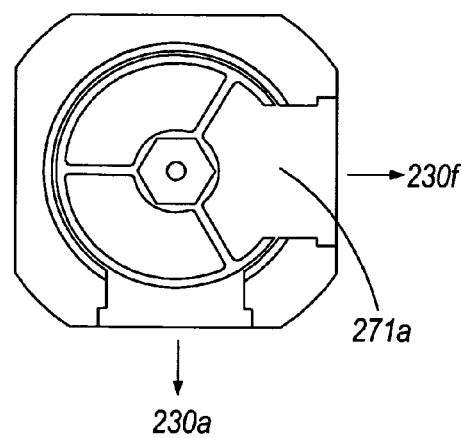
Fig.8c
Fig.8d

REFUEL VALVE ASSEMBLY AND METHOD FOR REFUELLING AN AIRCRAFT

BACKGROUND OF THE INVENTION

The present invention concerns a refuel valve assembly and a method for refuelling an aircraft. More particularly, this invention concerns a refuel valve assembly and a method for refuelling an aircraft with two or more tanks.

More specifically, the invention concerns a refuel valve assembly for refuelling a first and a second fuel tank on an aircraft, wherein the refuel valve assembly comprises an inlet for receiving fuel from an orifice in a structure of the aircraft, a first and a second outlet for delivering fuel from behind the structure to the first and second fuel tanks.

The invention also concerns a method of refuelling an aircraft with two or more fuel tanks, the method comprising the steps of delivering fuel to an orifice in a structure of the aircraft, then receiving the fuel in an inlet of a refuel valve assembly behind the structure, and providing a plurality of outlets in the refuel valve assembly for delivering the fuel to the fuel tanks.

The structure of the aircraft may be a spar of the aircraft, for example the forward spar. The structure of the aircraft may be a wing skin, for example a lower wing skin. The location of orifice takes into account a mandatory safety distance from hot surfaces such as engine exhausts and wheel brakes. Also the structure which the orifice is in must be able to react a load that may be experienced from the refuelling equipment. Typically on a large passenger aircraft with a dihedral wing this would place the orifice outboard of the (outboard) engine and as a result, place it high above ground level. So access to the refuel valve assembly becomes important and for this reason the lower wing skin (aft of the forward spar) and the forward spar itself become candidates for placement of the orifice. Notably, locating the orifice in the aft spar is more difficult as it is usually smaller than the forward spar and includes flaps and ailerons etc. In addition, some civil aircraft also have a gravity feed for fuel, for which is located on the upper wing surface. In this case, the orifice would be in the upper wing skin.

Existing refuel systems for refuelling two or more tanks fall broadly into two categories; (i) a gallery system and (ii) a system using a refuel manifold and separate delivery lines.

In both systems, fuel is supplied from ground equipment such as a fuel bowser, or similar. During refuel, the fuel is passed from the ground equipment to a refuel coupling on the aircraft through a fuel pipeline. The refuel coupling is generally located at the wing leading edge, in front of the wing front spar.

In a gallery system, as shown in FIGS. 1a, 1b and 1c, there is generally one hole in the front spar 13 of the aircraft wing 10. The refuel coupling 20 is connected to this hole in front of the front spar 13, behind the wing leading edge 12 and is covered by a refuel coupling cap 21 (shown in FIG. 1c) when refuel is not taking place. The refuel coupling 20 can also be accessed by an access panel 14 on the underside of the wing for maintenance. The refuel coupling 20 connects to the ground equipment during refuel.

Behind the front spar 13, a fuel tank delivery line 30 is connected around the hole. The fuel tank delivery line 30 splits using connector joints at various points to connect to the different fuel tanks 11 on board the aircraft. At each connector joint there is a ball valve that controls flow of fuel from the fuel tank delivery line 30 into the designated fuel tank 11. Tank 11a is the right wing tank, tank 11b is the centre tank and tank 11c is the left wing tank. There is also a solenoid controlled shut-off valve (not shown) on the fuel delivery line 30, near the hole in the front wing spar 13. This shut-off valve can either be open, to allow fuel to be delivered to the fuel tanks 11, or closed, to prevent fuel being delivered to the fuel tanks 11. During fuel delivery, fuel is pumped into the fuel delivery line 30 through the refuel coupling 20 and the hole in the front wing spar 13.

It is essential to balance fuel delivery to the different tanks so that the fuel flow to each tank is proportionate to the tank volume. It is also essential that the fuel tanks are not over-pressurised and that there is no fuel spillage due to over-filling of the tanks. This is achieved by providing fixed orifice plate restrictors 31a, 31b in various places on the fuel delivery line. Shut-off valves (not shown) are also provided at the branching of the line 30 into different tanks 11. The fixed orifice plate restrictors 31a, 31b act to restrict fuel flow and reduce pressure in the fuel delivery line 30 downstream of the restrictor. A fixed orifice plate restrictor 31b (shown in FIG. 1b) with a small orifice is in place towards the end of the fuel delivery line 30 in the branch line to the left wing tank 11c to restrict fuel delivery into left wing tank 11c, the downstream most tank on the delivery line 30. A larger orifice restrictor 31a is in place further upstream on the delivery line 30 in the branch line to the right wing tank 11a.

These restrictors 31a, 31b act to increase the refuel time as they reduce the fuel flow.

In addition, their presence causes Electro-Static Discharge (ESD) to build up in the fuel. This is because the restrictors disturb the fuel flow. Fuel flowing through a restrictor has increased flow turbulence and suffers from a shearing effect and a pressure drop. As a result, the fuel has an increased charge density.

In the gallery system, the restrictors 31 are placed as far away from a diffuser in the tanks 11 as possible to give the fuel maximum length of delivery line to "relax". This "relaxing" of the fuel reduces the ESD in the fuel. However, the distances between the restrictors and the diffusers are governed by the location of the shut-off valve to each tank, the location of the diffuser (located at the lowest point of the tank 11) and trying to achieve a minimised system weight. Hence, the distances of the restrictors from the diffusers are, in fact, relatively small when compared to the total length of the delivery line 30.

Furthermore, the presence of connector joints in the delivery line 30 causes additional turbulence to the fuel, and therefore additional ESD is built up in the fuel.

In order to keep the level of ESD acceptably low, the fuel flow rate has to be purposefully reduced. This obviously increases the refuel time.

Furthermore, the fuel flow rate must also be kept low in order to prevent downstream surge pressures upon shutting of the control valve or shut-off valves. These downstream surge pressures can be caused when the valves are closed and causes a low-pressure region adjacent to the valve. This can cause the column of fuel downstream of the low-pressure region to return and impact on the valve.

In addition, upstream surge pressures are also created when the valves are shut too quickly. There are methods of trying to reduce these surge pressures such as shutting the—valves slowly, limiting fuel flow rate, using flexible delivery line hosing and using pressure reducing valves. However, each of these has their own disadvantages.

Any surge pressures must be accommodated by the refuel system components and this adds weight and complexity to the system.

In the separate delivery lines system, as shown in FIG. 2, there are many holes 115a, 115b, 115c in the front wing spar 113, each hole being connected to a separate delivery line 130a, 130b, 130c leading to one of tanks 111 on the aircraft. Hence, there is a hole in the spar for each tank that is to be refuelled. A manifold 122 is connected to the front of the front wing spar 113 and covers all of the holes in the wing spar. The manifold 122 has a solenoid valve 123a, 123b, 123c associated with each spar hole 115a, 115b, 115c. The solenoid valves 123 can either be open or closed to control delivery of fuel into the different delivery lines 130. The manifold 122 is connected to a refuel coupling 120 that connects to the ground equipment during refuel.

During fuel delivery, fuel is pumped from the ground equipment to the refuel coupling 120 and into the manifold 122. The fuel is then delivered to the different fuel tanks 111 by opening the corresponding solenoid valves 123 in the manifold 122. In addition, flow restrictors (not shown) are also required in the individual delivery lines 130 leading to the fuel tanks. This is because actual restriction requirements are dependent upon the different tank 111 volumes and the wing tank vent system.

This manifold and separate delivery lines system requires the wing front spar 113 to be provided with a hole 115 for each tank that needs to be refuelled. To enable sufficient structure to react the load applied to the wing spar, there must be a minimum separation between the holes in the wing spar. This distance is called the pitch. With a larger pitch and/or more holes in the spar, the manifold must be longer in length. This means that the weight of the manifold, and therefore the aircraft as a whole, is increased. In addition, for each hole, there is an area of re-enforcement (not shown) around the hole in order to stabilise the spar structure. This also increases the weight of the aircraft for each hole.

Furthermore, if an aircraft is provided with a later additional fuel tank, modification of the wing spar 113 is needed in order for an additional hole to be cut in the spar 113 to allow the additional fuel tank to be refuelled. For example, if the aircraft is manufactured with three tanks and an additional cargo tank (ACT) is then desired, a fourth hole would need to be provided in the wing spar 113, a certain minimum pitch from any of the existing holes. The additional hole needs to be provided with re-enforcement. The manifold 122 then also requires modification in order to cover the additional hole. Both of these add to the weight of the aircraft. If a further ACT is desired, this again requires a further additional hole, adding again to the weight of the aircraft. Furthermore, where numerous ACT's are to be added, adaptation of the wing spar 113 in production or service may give rise to complications that could prevent installation of the required additional equipment. It is not generally considered feasible to modify the wing spar for the above-mentioned reasons. Hence, another method of adding the additional tanks must be found, which involves modifying the existing refuel system, which may make it inefficient.

If the wing is made from a metallic structure (for example, aluminium alloy), it is fairly simple to modify the spar to provide additional holes for any additional tanks required, as long as the changes are within the scope of structural change allowed by the metallic wing. However, this obviously adds to the cost of providing additional tanks, either during production or in service.

If the wing is made from a composite material, such as Carbon Fibre Re-enforced Plastic (CFRP), it is especially difficult to modify the spar to provide additional holes for any additional tanks. This is because the re-enforcement required for the holes needs to take the form of composite layers being added across and along the structure and not just locally to the hole, as in metallic structures. Hence, additional holes in a composite wing structure and the subsequent re-enforcement, may add more weight than in a comparative metallic structure. It also means that, due to the production method of a composite spar, post-production modification is extremely difficult. Hence, the number of holes in the wing must be minimised (to minimise weight). The number of holes must also provide for any foreseeable addition to the number of fuel tanks so that a whole new spar is not required. For example, an aircraft may have six ACT's to be installed as an option. This means that the manifold and separate delivery lines system is not particularly suitable for use in composite wing structures, as any weight reduction due to the use of composites is negated by the increase in weight (estimated at 1.5 kg) for each of the required holes. The estimate of 1.5 kg is based on a spar for a single-aisle aircraft such as an Airbus A320.

In addition, both systems utilise solenoid control valves. However, the use of solenoid valves has disadvantages. For example, the solenoid valve represents a convoluted route for the fuel and so results in a pressure drop across the valve. The solenoids of the valves must be mounted on the valves and this means that they may be difficult to access for maintenance purposes. Also, the solenoids require a constant drain on the aircraft electrical system during refuel as at least one solenoid in each valve must be powered during refuel. In addition, the powered solenoid will get heated up which can cause decreased reliability.

The present invention seeks to mitigate the above-mentioned problems. Alternatively or additionally, the present invention seeks to provide an improved refuel valve assembly and method for refuelling an aircraft with two or more tanks.

SUMMARY OF THE INVENTION

The present invention provides, according to a first aspect, a refuel valve assembly for refuelling a first and a second fuel tank on an aircraft, wherein the refuel valve assembly comprises an inlet for receiving fuel from an orifice in a structure of the aircraft, a first and a second outlet for delivering fuel from behind the structure to the first and second fuel tanks, and a refuel control apparatus for controlling fuel flow to the first and second outlets; wherein the refuel control apparatus comprises a controllable valve assembly, so that delivery of fuel through the first outlet to a first fuel tank can be controlled independently of delivery through the second outlet of fuel to a second fuel tank.

Hence, only a single hole in the wing structure is required in order to deliver fuel to the refuel valve assembly. The plurality of outlets in the refuel valve assembly allows fuel to be delivered to a plurality of tanks. Therefore, a plurality of tanks can be refuelled through only one hole in the structure of the aircraft.

Furthermore, the controllable valve assembly allows fuel to be delivered to the different fuel tanks independently at different flow rates. Hence, there is no need for additional flow restrictors, such as fixed orifice plate restrictors.

In addition, as the refuel valve assembly itself delivers the fuel to the plurality of outlets, fuel can be delivered to a plurality of tanks, without a split delivery line. In other words, a continuous delivery line can deliver fuel from one outlet to one fuel tank. There is no need for the delivery line to split in order to deliver fuel to a second fuel tank. Hence, the need for connector joints in the delivery lines is reduced.

In addition, the fuel is given a long distance along the delivery line (a major proportion of the distance from the refuel valve assembly to the tank) to "relax" without a restrictor or other flow disturbance.

All of these give an embodiment of the invention the advantage that the amount of ESD in the fuel is reduced and the refuel time can also reduce.

Another advantage is that there is no need for fixed plate restrictors in the delivery lines.

A further advantage is that the controllable valves are within the refuel valve assembly so can be very close to the structure of the aircraft and therefore, close to the refuel coupling. Therefore, surge pressures upstream of the controllable valve are contained within the refuel assembly and refuel coupling. There is no need to design the delivery lines to cope with upstream surge pressures (as they are open ended to the fuel tanks).

Another advantage of an embodiment of the invention is that the effect of surge pressures downstream of the controllable valve is minimised as the controllable valve is close to the refuel coupling and separate open-ended delivery lines to the fuel tanks can be used.

Preferably, the controllable valve assembly comprises a first controllable valve for controlling fuel flow to the first outlet, and a second controllable valve for controlling fuel flow to the second outlet; wherein the first and second controllable valves are operable independently of each other. This allows control of fuel flow through the outlets to be independently controlled by separate valves.

Preferably, controllable valve assembly comprises a controllable valve with multiple ports that can be controlled to open and close access of fuel to at least two outlets, for example to the first outlet and a third outlet. This allows one controllable valve to control flow of fuel to more than one outlet, and therefore more than one fuel tank.

The ports of the valves may be any shape, according to requirements. For example, the ports may be circular, as shown in the Figures. Alternatively, the ports may be square or rectangular. A rectangular port with the shortest side of the rectangle being axial with valve assembly body is considered to be the most efficient shape, as a smaller axial dimension can be used for the same area of port. A rectangular or square shaped port allows fuel flow to be more easily controlled as a linear amount of rotation of the ports gives a linear increase/decrease in the fuel flow. The port holes could also be a combination of shapes. For example, a triangle port could be used with straight, convex or concave sides. Having a particular shape enables the fuel flow to be accurately controlled. It is noted that no matter what the port shape used, the most efficient shape of pipe (in terms of weight versus load carrying capability) is circular. Hence, any non-circular port shapes need to be connected to a connector, with a corresponding non-circular inlet and a circular outlet, in order for the port to be able to be connected to a circular pipe.

Preferably, the controllable valve(s) are rotatable such that ports of the valves can rotate to align with the refuel valve assembly outlets. Having rotatable valves allows the valves to be controlled by rotatable gears in a central shaft in the refuel valve assembly.

Preferably, the controllable valve(s) are moveable to vary the degree of alignment of ports of the valves with the refuel valve assembly outlets. This allows the fuel flow rate to the different outlets to be varied by controlling the valves. This can minimise surge pressures by ensuring that access of fuel to the outlets is changed gradually, rather than by step-change. It also allows the refuel flow rate to be actively managed.

Preferably, the controllable valve(s) are controlled by a motor, connected to a refuel computer, so that the valve(s) can be controlled based on real time refuel data.

More preferably, each controllable valve is controlled by a different motor. This allows each motor to be controlled independently.

Preferably, the motor(s) controlling the controllable valve(s) are located on a motor drive head, in front of the refuel valve assembly inlet so that the motor(s) are located in front of the structure. This allows the motors to be accessed from the front of the structure, without interfering with the refuel control apparatus.

Preferably, the refuel control apparatus comprises a shut-off valve, moveable to close fuel access to the refuel valve assembly outlets, independently of the configuration of any controllable valves. This allows delivery of fuel to all outlets to be completely stopped, independently of the controllable valves.

More preferably, the shut-off valve is in the form of a sleeve at least partially enclosing the controllable valves, wherein the sleeve is slideable with respect to the controllable valves between an open position and a closed position. This allows the shut-off valve to control fuel flow between the controllable valves and the refuel valve assembly outlets. It also allows the shut-off valve to move independently of the position of the controllable valves.

Even more preferably, the shut-off valve is biased towards the closed position so that in the absence of fuel flow through at least part of the refuel valve assembly (and the resulting fuel pressure), the shut-off valve closes. This allows the shut-off valve to move automatically into its closed position. Additionally, a means of detecting the position of the shut-off valve may be provided. This allows failure of the shut-off valve to be identified, for example if the valve gets stuck in one position. This means could be a position switch or sensor or an LVDT (linear variable differential transformer) or linear potentiometer.

Even more preferably, when there is a loss of electrical power to the refuel valve assembly, fuel flow through at least part of the refuel valve assembly is prevented, such that the shut-off valve closes. This means that the shut-off valve automatically moves into its closed position when power is lost.

Preferably, the shut-off valve can be moved into the open position to allow refuelling, in the absence of power, by activating a manual override apparatus.

Preferably, the refuel valve assembly comprises a defuel inlet for receiving fuel, and wherein the controllable valve assembly comprises a controllable valve for controlling fuel flow through the defuel inlet to the refuel valve assembly, to allow defueling. This allows fuel to be delivered into the refuel valve assembly and then defueled from the aircraft through a refuel coupling. This defuel can be controlled by the controllable valve assembly.

More preferably, the controllable valve for controlling flow through the defuel inlet can also control flow through an outlet of the refuel valve assembly. This means that a separate controllable valve for defuel is not required.

Even more preferably, the shut-off valve is also moveable to close fuel access to the refuel valve assembly from the defuel inlet, independently of the configuration of any controllable valves. This allows the shut-off valve to stop defueling as well as refuelling.

Even more preferably, the shut-off valve can be moved into the open position to allow defueling, in the absence of power, by activating a manual override apparatus.

Preferably, the refuel valve assembly is mounted in a manifold shaft and wherein tank delivery lines are connectable to attachment points on the manifold shaft, the attachment points corresponding to the location of the outlets of the valve assembly.

More preferably, the controllable valve assembly is contained within a casing in the manifold shaft and wherein the casing can be removed from the manifold shaft through the front of the structure orifice. This allows easy access to the controllable valve assembly.

Preferably, the refuel valve assembly is connected to two refuel couplings such that fuel delivered to either refuel coupling is supplied to an inlet of the refuel valve assembly. This allows the aircraft to be refuelled (or defueled) from two different refuel couplings, for example, on two different sides of the aircraft.

The invention also provides a refuel structure comprising a refuel valve assembly as described above and a plurality of tank delivery lines connected to the outlets of the refuel valve assembly.

Preferably, the tank delivery lines are connected to an air feed line, such that air can flow into the tank delivery lines urging fuel in the tank delivery lines to drain out into the fuel tank. This prevents fuel remaining in the delivery lines. The air feed line also helps to reduce downstream surge pressures.

More preferably, the air feed lines incorporate a non-return valve so that air flows into the tank delivery line but fuel cannot flow past the non-return valve.

More preferably, the air feed line is connected to a vent/surge tank so that air flow into the tank delivery line is from the vent/surge tank.

The invention also provides a tank refuel system comprising the refuel structure as described above and a plurality of fuel tanks; one attached to each tank delivery line.

The invention also provides an aircraft comprising the refuel valve assembly, refuel structure or tank refuel system as described above.

Preferably, the refuel valve assembly is located in a wing of the aircraft, behind a front spar.

The invention also provides, according to a second aspect, a method of refuelling a first and a second fuel tank on an aircraft, the method comprising the steps of: delivering fuel to an orifice in a structure of the aircraft, then receiving the fuel in an inlet of a refuel valve assembly behind the structure, and operating a controllable valve assembly so as to control fuel flow to a first and a second outlet of the refuel valve assembly, so that delivery of fuel through the first outlet to the first fuel tank can be controlled independently of delivery through the second outlet of fuel to the second fuel tank.

It will of course be appreciated that features described in relation to one aspect of the present invention may be incorporated into other aspects of the present invention. For example, the method of the invention may incorporate any of the features described with reference to the refuel valve assembly of the invention and vice versa.

DESCRIPTION OF THE DRAWINGS

Embodiments of the present invention will now be described, by way of example only, with reference to the accompanying schematic drawings, in which:

FIGS. 8a, 8b, 8c and 8d show cross-sectional views through a right tank annular valve as used in the refuel valve assembly of FIG. 5;

FIG. 12b shows an enlargement of the refuel solenoid assembly shown in FIG. 12a;

DETAILED DESCRIPTION

Figure 3A:
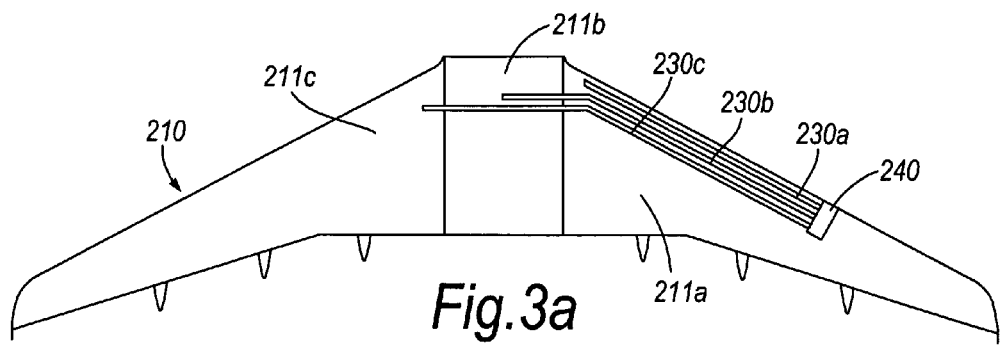
FIG. 3a shows a plan view of an aircraft wing employing a refuel valve assembly, according to a first embodiment of the invention.

FIG. 3a shows a plan view of an aircraft wing 210 employing a refuel valve assembly 240 according to a first embodiment of the invention.

A refuel coupling 220 (shown in FIG. 5) is connected to the front side of a front spar 213 of a starboard-side aircraft wing. The refuel coupling has an elliptical inlet for receiving fuel from ground equipment and an outlet. The outlet is connected around the front of a hole 215 in the front wing spar 213.

The refuel valve assembly 240 has an inlet for receiving fuel from the refuel coupling. The inlet of the refuel valve assembly 240 is connected around the rear of the hole 215 in the front wing spar 213. The refuel valve assembly 240 has three outlets, each one leading to a separate delivery line 230a, 230b, 230c. Delivery line 230a leads to the right wing tank 211a, delivery line 230b leads to the centre tank 211b, and delivery line 230c leads to the left wing tank 211c of the aircraft.

Figure 3B:
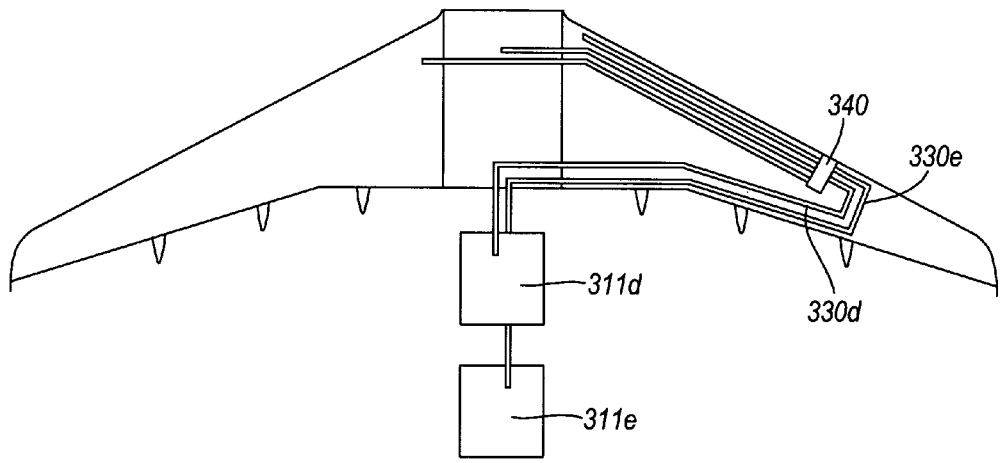
FIG. 3b shows a plan view of an aircraft wing employing a refuel valve assembly, according to a second embodiment of the invention.
Figure 3C:
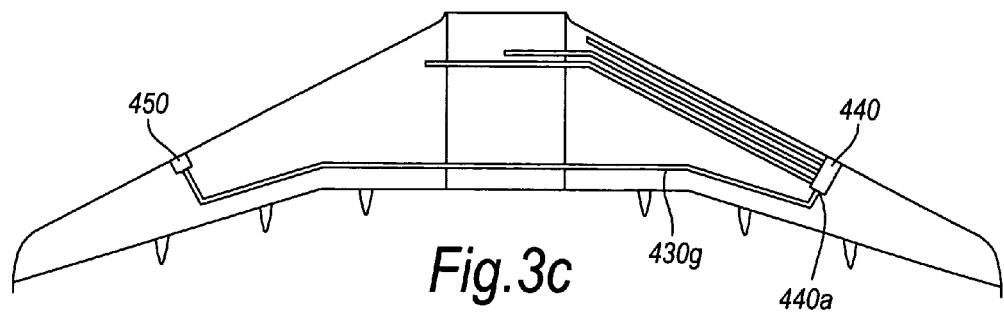
FIG. 3c shows a plan view of an aircraft wing employing a refuel valve assembly, according to a third embodiment of the invention.

The second and third embodiments of the invention, as shown in FIGS. 3b and 3c, will be described later.

Figure 1A:
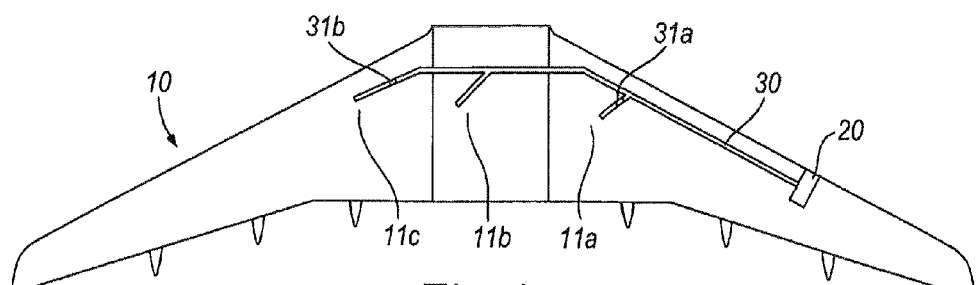
FIG. 1a shows a plan view of an aircraft wing employing the prior art gallery refuelling system.
Figure 1B:
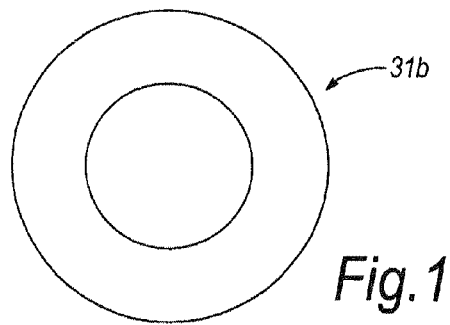
FIG. 1b shows a front view of a fixed orifice plate restrictor as used in the prior art gallery refuelling system.
Figure 1C:
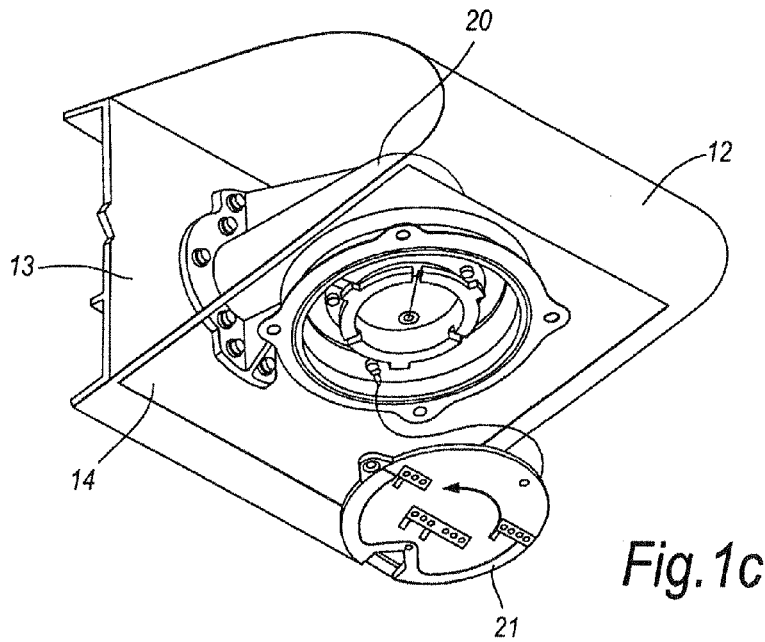
FIG. 1c shows an underside perspective view of the refuel coupling used in the prior art gallery refuelling system.
Figure 2:
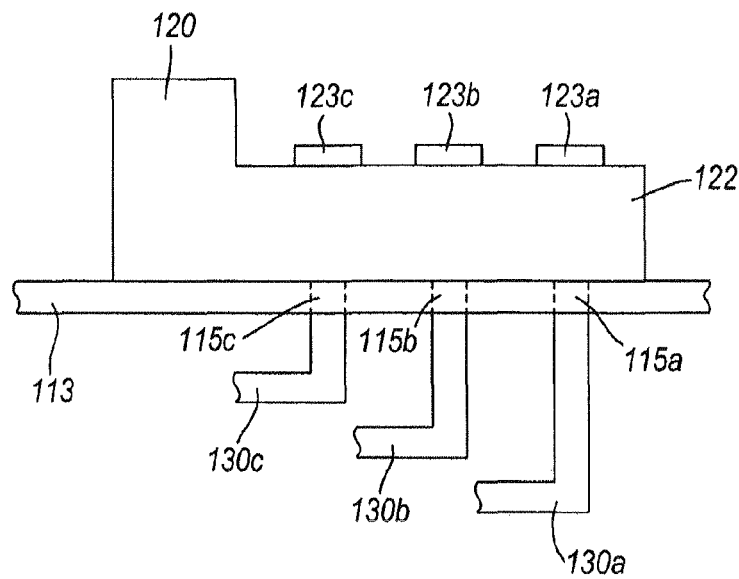
FIG. 2 shows a schematic plan view of the prior art manifold and separate delivery lines refuelling system.
Figure 4:
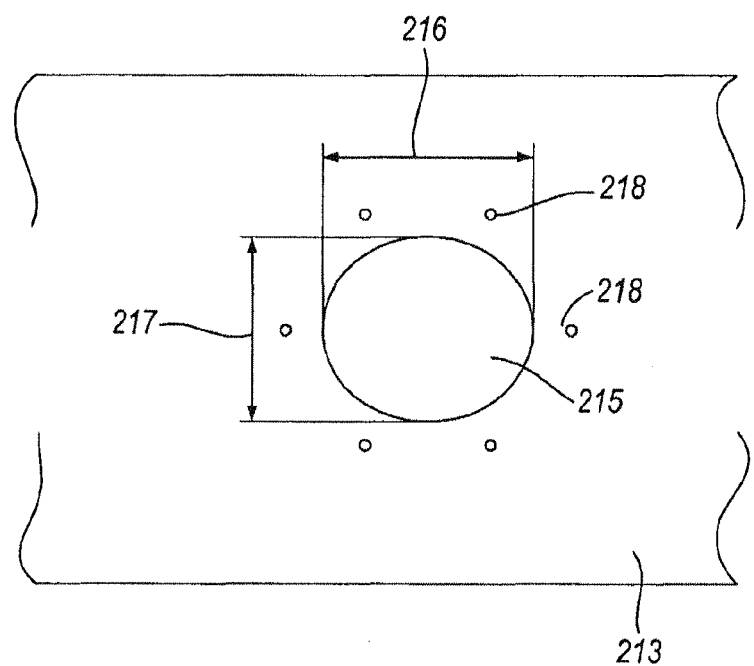
FIG. 4 shows a front view of a front wing spar with a hole for receiving a refuel valve assembly according to the first, second or third embodiments of the invention.

In the first embodiment shown in FIG. 3a, the wing front spar 213 has a single refuel hole 215, as shown in FIG. 4. The hole 215 is elliptical with a longer dimension in the horizontal (outboard-inboard) direction. The horizontal dimension, shown as 216, is 4.5 inches (115 mm). The vertical dimension, shown as 217, is 4 inches (100 mm). The hole 215 is elliptical because this allows for various sensors and/or monitoring equipment, for example pressure sensors to measure the pressure in delivery lines 230a, 230b, 230c, (not shown) to be connected to the refuel valve assembly 240 and delivery lines 230 in the "corner" regions surrounding the elliptical profile. Six attachment holes 218 are provided around the refuel hole 215 to allow attachment of the refuel valve assembly 240 to the front wing spar 213.

Figure 5:
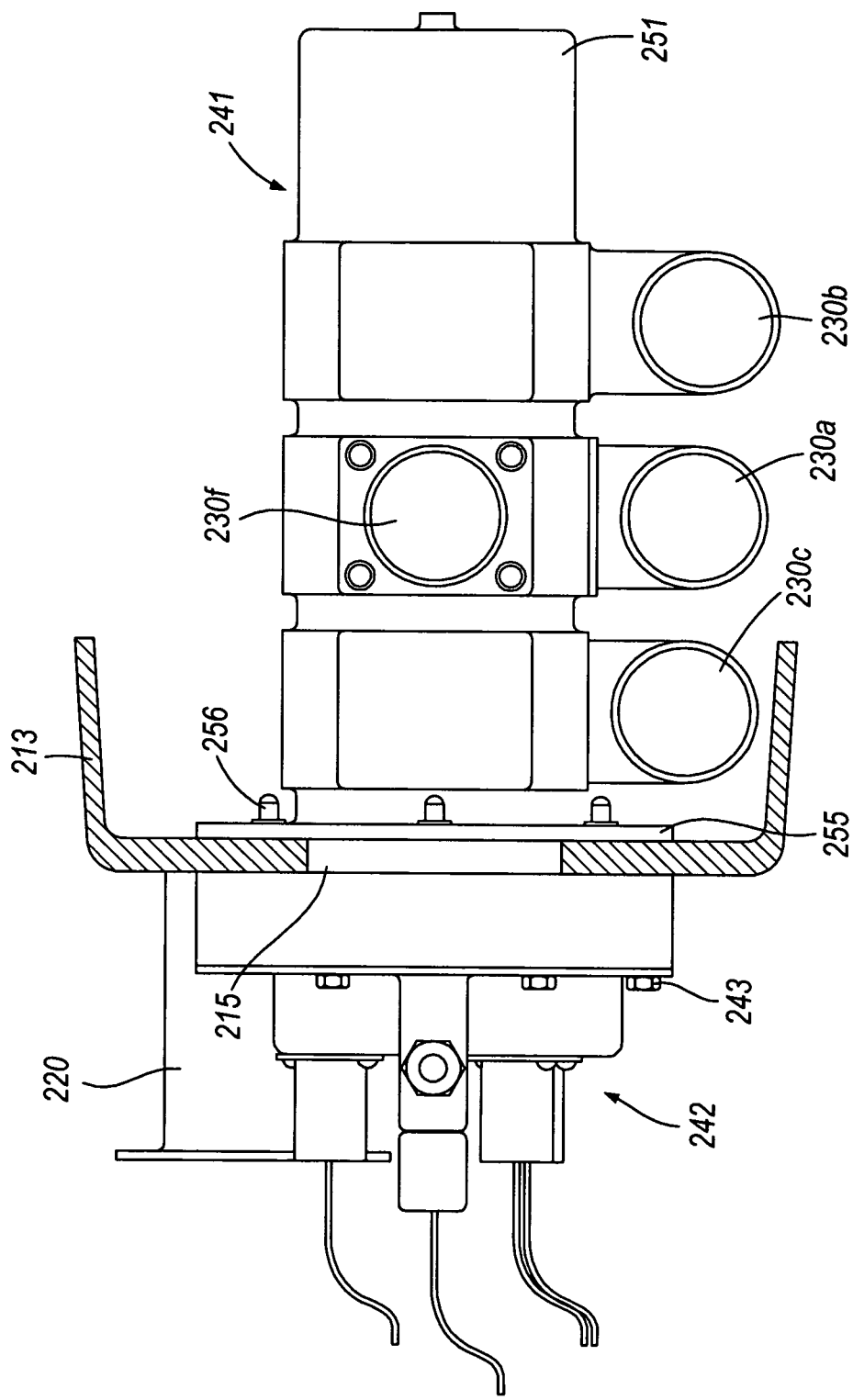
FIG. 5 shows a side view of a refuel valve assembly according to the first embodiment of the invention, with the sleeve valve in the open position.

The refuel valve assembly 240 includes a manifold section 241 and a motor drive head section 242, as shown in FIG. 5.

The manifold section 241 comprises a shaft with a cylindrical shaft inner casing 250 and a cylindrical shaft outer casing 251. The shaft outer casing 251 is in the form of a tube with a closed-end at a back end and a flange 255 at the other, front end. The shaft inner casing 250 is in the form of a tube with one open, back end. The shaft inner casing 250 fits snugly within the shaft outer casing 251. The open, back end of the inner casing 250 is located towards the closed, back end of the outer casing 251. The flange 255 of the outer casing is attached to the rear side of the wing front spar 213 by fasteners through spar attachment holes 218. The flange 255 is attached so that the inside edge of the flange is flush with the edge circumference of the spar hole 215.

The shaft inner casing 250 protrudes from the outer casing 251 at the front end and extends through the spar hole 215. At this end of the spar inner casing 250, in front of the wing front spar 213, the inner casing 250 is connected to the refuel coupling 220 such that fuel from the refuel coupling 220 can enter inside the inner casing 250 in the manifold shaft 241. The inner shaft casing 250 is contained within outer casing 251, and attached by inner casing fasteners (not shown).

The motor drive head 242 is attached to the front of the wing spar 213 by screws 243 going through the front of the inner casing 250.

Figure 6:
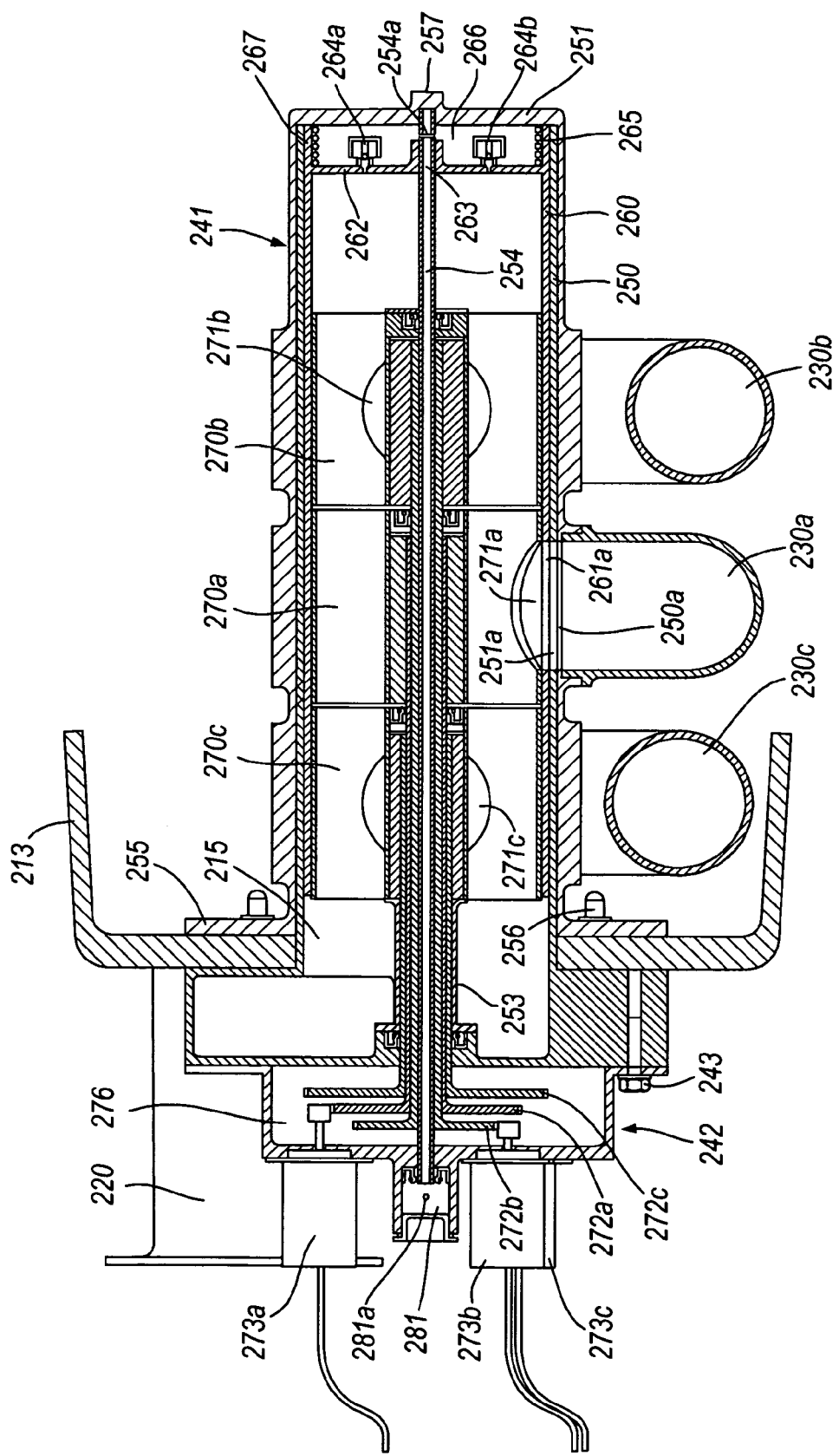
FIG. 6 shows a side sectional view of the refuel valve assembly of FIG. 5.

The shaft outer casing 251 has various holes, 251a, 251b and 251c (only 251a shown in FIG. 6). Each hole 251 lines up with an attachment point for the corresponding delivery line 230a, 230b, 230c. The shaft inner casing has similar holes 250a, 250b and 250c (only 250a shown in FIG. 6). Again, each hole lines up with the attachment point for the corresponding delivery line 230a, 230b, 230c and the corresponding holes 251a, 251b and 251c in the outer casing.

As can be seen in FIGS. 5 and 6, the right tank delivery line 230a is attached to a middle section of the manifold 241, on the underside. The left tank delivery line 230c is attached to a front section of the manifold 241, on the far side as viewed in FIGS. 5 and 6, i.e. on the outboard side. The centre tank delivery line 230b is attached to a back section of the manifold 241, on the far side as viewed in FIGS. 5 and 6, i.e. on the outboard side.

In addition, there is an attachment point for a defuel line 230f and a corresponding hole 251f in the outer casing 251 and corresponding hole 250f in the inner casing 250. The defuel line 230f is attached to the middle section of the manifold 241, at the same point along the manifold 241 as the right tank delivery line 230a. However, the defuel line 230f is attached at 90 degrees to the right tank delivery line 230a, on the near side as viewed in FIGS. 5 and 6, i.e. on the inboard side, opposite to the left and centre tank delivery line attachment points. The defuel line 230f does not lead to a fuel tank, like the delivery lines 230a, 230b, 230c. Instead, it leads to an engine feed (not shown). Hence, fuel that is being delivered to the engine from the various tanks 211 through the engine feed, can be intercepted by the defuel line 230f. In this way, engine feed pump(s) may be used as the force to defuel the aircraft (as it is the engine feed pumps that pressurise the defuel line 230f).

The manifold 241 also has a shut-off sleeve valve 260. This sleeve valve 260 is in the form of a tube with an open end. The sleeve valve 260 fits snugly within the inner casing 250 and is placed so that the open end is towards the front end of the manifold 241 such that fuel that enters the manifold from the refuel coupling 220 is received within the sleeve valve 260. The sleeve valve 260 is slideable backwards and forwards within the inner casing 250 but cannot rotate within the inner casing 250. It is prevented from rotating by the fact that the sleeve valve 260 has a slightly elliptical outer profile, which matches to an elliptical inner profile of the inner casing 250. The elliptical profiling prevents the sleeve valve holes 261 from rotating out of alignment with the delivery and defuel lines 230.

Figure 12A:
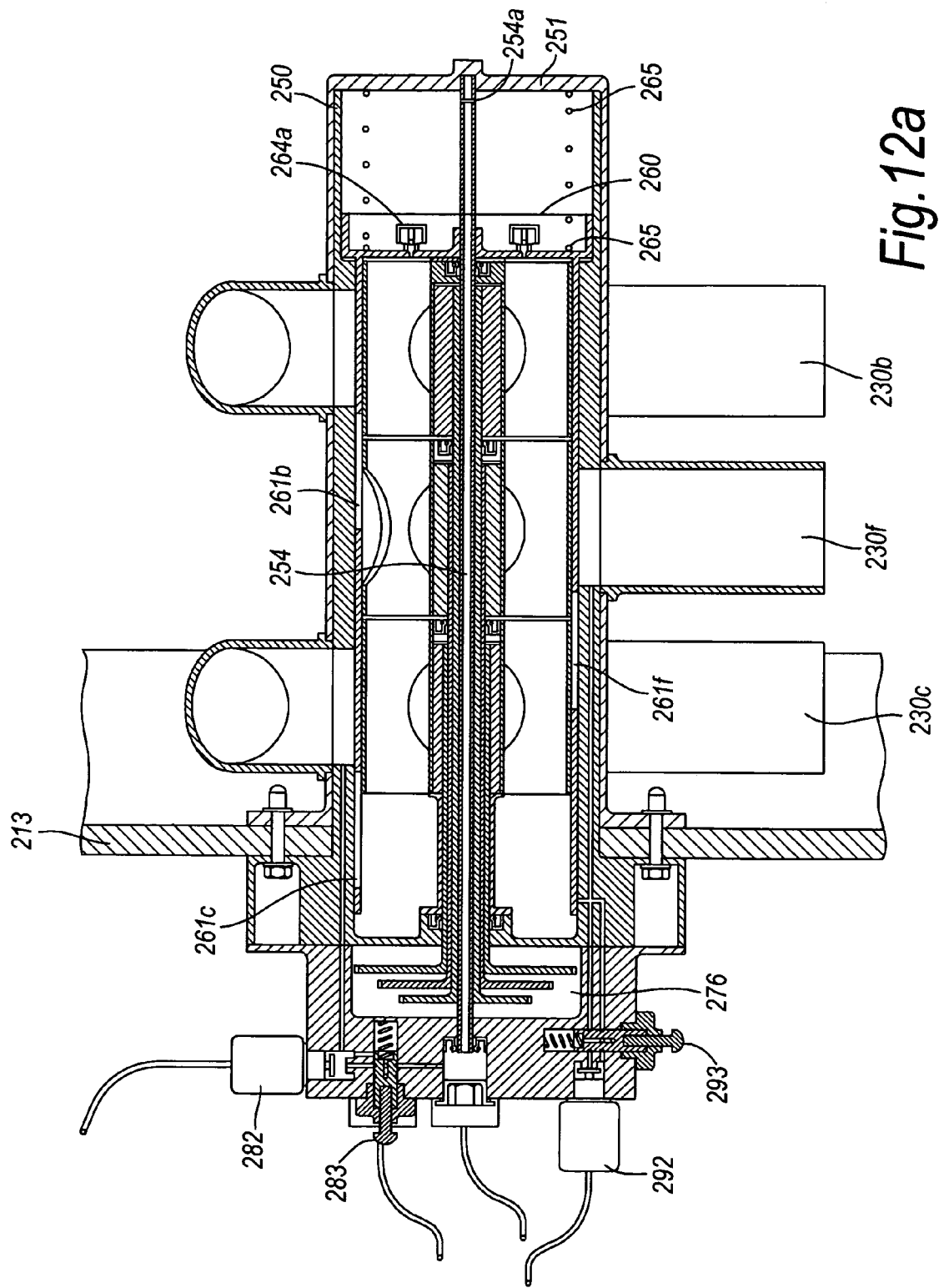
FIG. 12a shows a plan sectional view of the refuel valve assembly of FIG. 5, with the sleeve valve in the closed position.

At the back end of the sleeve valve 260 is a wall 262 that closes off the sleeve valve 260. Behind the wall 262 is an enlarged section 267 of the sleeve valve. The enlarged section 267 has a larger cross-sectional area such that the cross-sectional area of the wall 262 is larger on the back side of the wall than the front side of the wall 262. A spring 265 is attached to the back of the wall 262, between the wall 262 and the closed end of the outer shaft casing 251 so as to urge the sleeve valve 260 away from the back end of the manifold shaft 241 (as shown in FIG. 12a). In this position, the spring 265 takes up its natural (non-compressed) state. FIG. 6 shows the spring 265 in its compressed state. This spring ensures the sleeve valve 260 is maintained in the closed position (as shown in FIG. 12a), in the absence of any fuel pressure.

The wall 262 of the sleeve valve 260 has a balance hole 263 in the centre. In addition, there are two non-return valves 264a, 264b that allow fuel to flow from inside the sleeve valve 260, through wall 262 into a balance chamber 266 in between the sleeve valve 260 and the closed end of the outer casing 251.

The sleeve valve 260 has various holes 261a, 261b, 261c and 261f along its length (only 261a shown in FIG. 6). Each hole 261 is designed to line up with the corresponding holes for the delivery and defuel lines 230 in the inner casing 250 and outer casing 251 when the sleeve 260 is in an open position. The sleeve open position is shown in FIG. 6, where the holes 261a, 261b, 261c and 261f line up with the attachment points of the delivery lines 230a, 230b and 230c and the defuel line 230f. Here, the sleeve valve 260 is in its backwards most position with the end of the enlarged section 267 abutting the back of the manifold 241 and the spring 265 being compressed between the end wall 262 of the sleeve valve 260 and the outer casing 251 end wall.

In the closed position, shown in FIG. 12a, the sleeve valve 260 is further along the manifold shaft 241 towards the front, i.e. nearer the wing spar 213. In this position, the holes 261a, 261b, 261c, 261f do not line up with the corresponding holes in the inner 250 and outer casing 251. Here, the sleeve valve 260 is in its forwards most position, with the front of the sleeve valve 260 abutting the front end of the inner casing 250. The spring 265 at the back of the sleeve valve 260 is in its natural (non-compressed) state, between the wall 262 of the sleeve valve 260 and the back end of the manifold shaft 241, in the balance chamber 266.

Referring back to FIG. 6, towards the end of the spar inner casing 250 in front of the wing front spar 213, there is a hole. Connected the rear of the hole is a supportive core housing 253 which extends back into the inner casing 250.

A core channel tube 254 extends through the centre of this core housing 253 back to the end of the manifold shaft 241. It also extends forwards into a spur gear chamber 276 in front of the inner casing 250. The core channel tube 254 also extends through a hole in the front of the spur gear chamber 276 into a refuel solenoid chamber 281. The refuel solenoid chamber 281 is part of a refuel solenoid assembly 280 which will be described later.

Around the core channel tube 254 are arranged three spur gears 272a, 272b, 272c. These spur gears run backwards along the manifold shaft 241 to connect to three corresponding annular valves 270a, 270b, 270c, as will be explained later. The spur gears also run forwards into the spur gear chamber 276 where they are connected to corresponding spur gear motors 273a, 273b, 273c. These motors are attached in front of the spur gear chamber 276 and connect to the individual spur gears through holes in the front wall of the spur gear chamber 276. Hence, a motor drive head 242, including the motors 273, is defined as the casing of the front and side walls of the spur gear chamber 276. The front wall of the casing 250 provides the rear wall of the spur gear chamber 267. The spur gear motors 273 can be accessed from the front of the refuel valve assembly 240.

Each annular valve 270a, 270b, 270c is connected to its corresponding spur gear 272a, 272b, 272c and corresponding spur gear motor 273a, 273b, 273c. Each motor 273 controls the corresponding spur gear 272 to control rotation of the corresponding annular valve 270.

The three annular valves 270a, 270b, 270c are fitted longitudinally snugly inside the sleeve valve 260 so as to seal against it. The annular valves 270 and the sleeve valve 260 have material coatings (not shown) that are low in friction, and possibly, self-lubricating. This allows a close tolerance between the sleeve valve 260 and the annular valves 270. This allows the loss of fuel between them to be kept to a minimum. Each annular valve has at least one hole 271 so that when the hole 271 lines up correctly with the inner 250 and outer 251 casing holes and the sleeve valve 260 is in the open position, fuel in the manifold 241 can flow through the annular valve 270 and through the sleeve valve 260 and inner 250 and outer 251 casings into a tank delivery line 230a, 230b, 230c or the defuel line 230f.

The right tank annular valve 270a is situated in the manifold shaft 241 so that the hole 271a in it lines up longitudinally with the corresponding holes 250a, 251a of the inner and outer casing. Therefore, the right tank annular valve 270a is in the middle section of the manifold 241. Similarly, the left tank annular valve 270c is in the front section of the manifold 241 and the centre tank annular valve 270b is attached to a back section of the manifold 241.

The spur gears 272 extend backwards along the axis of the manifold shaft 241 from the spur gear chamber 276 and connect to the corresponding annular valve 270. Hence, centre tank spur gear 272b extends the furthest along the manifold 241 to the centre tank annular valve at the back side of the manifold 241. The centre tank spur gear extends along the manifold shaft adjacent and surrounding the core channel tube 254.

Outside of the centre tank spur gear 272b is the right tank spur gear 272a, which extends along the manifold shaft to the middle section where the right tank annular valve 270a is.

Outside of the right tank spur gear 272a is the left tank spur gear 272c, which extends along the manifold shaft to the front section where the left tank annular valve 270c is.

Each spur gear 272 has an approximately constant cross section tube portion, a flanged end and an annular valve attachment portion. The flanged ends of the spur gears 272 are located in the spur gear chamber 276 for connection with the corresponding spur gear motor 273. The tube portions of the spur gears vary in length, as described above, corresponding to the position of the corresponding annular valve 270 along the manifold 241. The cross sectional shape of the tube portion of the spur gears 272 also varies.

The centre tank spur gear 272b has a tube portion with an inner profile of a circle, corresponding to the diameter of the outer profile of the core channel tube 254. The outer profile of the centre tank spur gear 272b tube portion is of a circle with a larger diameter than the inner profile, with a slightly flattened top and bottom.

The right tank spur gear 272a has a tube portion with an inner profile of a circle, corresponding to the diameter of the outer profile of the centre tank spur gear 272b tube portion. The outer profile of the right tank spur gear 272a tube portion is of a circle with a larger diameter than the inner profile, with a slightly flattened top and bottom.

The left tank spur gear 272c tube portion has an inner profile of a circle, corresponding to the diameter of the outer profile of the right tank spur gear 272a. The outer profile of the left tank spur gear 272c tube portion is of a circle with a larger diameter than the inner profile, with a slightly flattened top and bottom.

The centre tank spur gear 272b has an annular valve attachment portion with an inner profile of a circle with a slightly flattened top and bottom. This corresponds to the outer profile of centre tank spur gear 272b tube portion. The annular valve attachment portion slides on the tube portion and cannot rotate with respect to the tube portion because of the flattened circle profiles. The outer profile of the centre tank spur gear 272b annular valve attachment portion is of a hexagon.

The right and left tank spur gear 270a, 270c annular valve attachment portions have similar core sections with inner profiles corresponding to the outer profiles of right and left tank spur gear 272a, 272c tube portions. The annular valve attachment portions slide on the tube portions and cannot rotate with respect to the tube portions because of the flattened circle profiles. The outer profile of the right and left tank spur gear 272a, 272c annular valve attachment portions are also hexagons, with the same dimensions as the hexagon of the centre tank spur gear 272b annular valve attachment portion.

The centre tank annular valve 270b has a core section 274b for attaching to the centre tank spur gear 272b. The core section is a tube with an inner profile of a hexagon, to correspond to the outer profile of the centre tank spur gear 272b annular valve attachment portion. Hence, centre spur gear 272b fits into the core section 274b of the centre tank annular valve 270b and cannot rotate with respect to the annular valve because of the hexagonal profile.

The right and left tank annular valves 270a, 270c have similar core sections 274a, 274c with inner profiles corresponding to the outer hexagon profiles of the right and left spur gears 272a, 272c. Again, the spur gears 272 and annular valves 270 cannot rotate with respect to the each other because of the hexagonal profiles.

All annular valves 270a, 270b, 270c also have radial legs 275a, 275b, 275c, extending outwards from the core sections 274, to connect the core hexagonal section 274 to the outer section of the valve, this outer section including the annular valve holes 271a, 271b, 271c.

The spur gear motors 273 can be controlled to move the spur gears 272 so that the holes 271 in the annular valves rotate with respect to the holes in the inner 250 and outer 251 casing. This means the holes 271 can be independently moved to control flow of fuel from the manifold 241 into the different delivery lines 230. The spur gear motors 273 are connected to a refuel computer (not shown), which controls the motors.

Figure 7A:
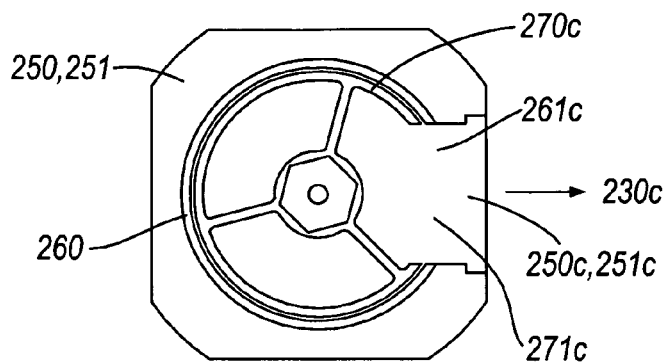
FIGS. 7a, 7b and 7c show cross-sectional views through a left tank annular valve as used in the refuel valve assembly of FIG. 5.
Figure 7B:
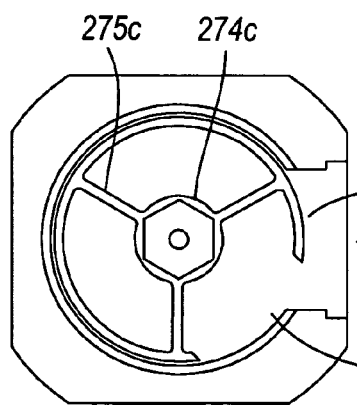
Figure 7C:
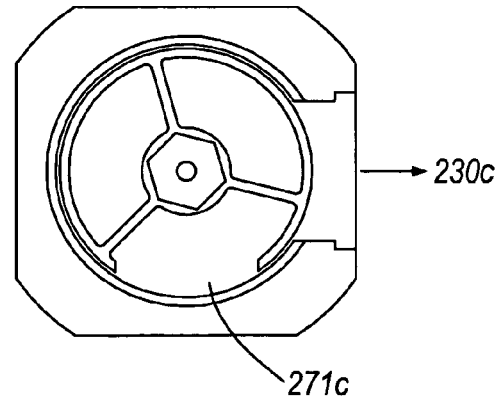

FIGS. 7a, 7b and 7c show a cross sectional view through the left tank annular valve 270c. They show the annular valve 270c inside the sleeve valve 260 and inner and outer casing 250, 251.

In FIG. 7a, the sleeve valve 260 is in the open position so that hole 261c in the sleeve valve 260 is adjacent the corresponding holes 250c, 251c in the inner and outer casing. The holes 250c, 251c lead to the left tank delivery line 230c. The annular valve 270c is rotated in a position such that the hole 271c in the annular valve is fully lined up with the holes leading to the left tank delivery line 230c. In other words the hole 271c is facing the far side of the manifold shaft 241 in FIG. 6. This allows maximum fuel flow through the annular valve 270c.

In FIG. 7b, the sleeve valve 260 is in the same open position as in FIG. 7a. However, the annular valve 270c is rotated in a position such that the hole 271c in the annular valve is no longer fully lined up with the holes leading to the left tank delivery line 230c. Instead, it is at 45 degrees to the position of FIG. 7a. Here, the fuel flow is limited to less than a quarter of the maximum fuel flow in FIG. 7a. In other words, the exposed area of the hole 271c in the annular valve is less than a quarter of the total area of the hole 271c.

In FIG. 7c, the annular valve 270c is rotated in a position such that the hole 271c in the annular valve is not at all lined up with the holes leading to the left tank delivery line 230c. Here, there can be no fuel flow through the annular valve 271c. However, as the sleeve valve 260 is now in the closed position so that holes 251c, 250c are closed off, there can be no fuel flow to the delivery line 230c independent of the rotation position of the annular valve 270c.

The centre tank annular valve 270b operates in a very similar way to the left tank annular valve 270c.

However, the right tank annular valve 272a can also be used for controlling flow of fuel into a defuel line 230f. As shown if FIG. 5, the middle annular valve 270a controls flow of fuel to the right tank delivery line 230a connected at the underside of the manifold shaft 241 and also to the defuel line 230f connected at the near side of the manifold shaft 241.

FIGS. 8a, 8b, 8c and 8d show a cross sectional view through the right tank annular valve 270a. They show the annular valve 270a inside the sleeve valve 260 and inner and outer casing 250, 251. The annular valve 270a has only one hole in it 271a and so is similar to the left and centre tank annular valves 270b, 270c. However, it can be rotated differently to also control fuel flow to the defuel line 230f.

In FIG. 8a, the annular valve 270a is rotated in a position such that the hole 271a in the annular valve is not at all lined up with the holes leading to the right tank delivery line 230a (or the defuel line 230f). Here, there can be no fuel flow through the annular valve 271a. However, as the sleeve valve 260 is in the closed position so that holes 251a, 251f, 250a, 250f are closed off, there can be no fuel flow to the delivery line 230a or defuel line 230f independent of the rotation position of the annular valve 270a.

In FIG. 8b, the sleeve valve 260 is in the open position so that holes 261a, 261f in the sleeve valve 260 are adjacent the corresponding holes 250a, 251a and 250f, 251f in the inner and outer casing. The annular valve 270a is rotated in a position such that the hole 271a in the annular valve is half lined up with the holes leading to the right tank delivery line 230a. Here, the fuel flow to the right tank is limited to less than a quarter of the maximum fuel flow.

In FIG. 8c, the sleeve valve 260 is in the same open position. The annular valve 270c is rotated in a position such that the hole 271a in the annular valve is fully lined up with the holes leading to the right tank delivery line 230a. In other words the hole 271a is facing the underside of the manifold shaft 241 in FIG. 6. This allows maximum fuel flow through the annular valve 270a to right tank delivery line 230a.

In FIG. 8d, the sleeve valve 260 is in the same open position. The annular valve 270a is rotated in a position such that the hole 271a in the annular valve is fully lined up with the holes from the defuel line 230f. In other words the hole 271a is facing the near side of the manifold shaft 241 in FIG. 6. This allows maximum fuel flow from the defuel line 230f through the annular valve 270a.

Referring back to FIG. 6, as previously described, a core channel tube 254 extends through the centre of the core housing 253 at the front of the manifold shaft 241 back to the end of the manifold shaft 241.

Outer shaft casing 251 has a notch 257 on the inside of the closed end. This notch 257 accommodates the back end of the core channel tube 254. Hence, the tube 254 runs along from the closed end of the outer casing 251, through the hole 263 in the closed end of the sleeve valve 260 and through the inner casing 250 along the centre of the manifold shaft 241 and into the spur gear chamber 276 and refuel solenoid chamber 281, as previously described. Near the back of the tube 254, in the balance chamber 266, is small hole that allows fuel that is in the balance chamber 266 to enter the tube 254 and run along it. The fuel runs into the refuel solenoid chamber 281 and through a refuel solenoid port 281a.

Figure 9:
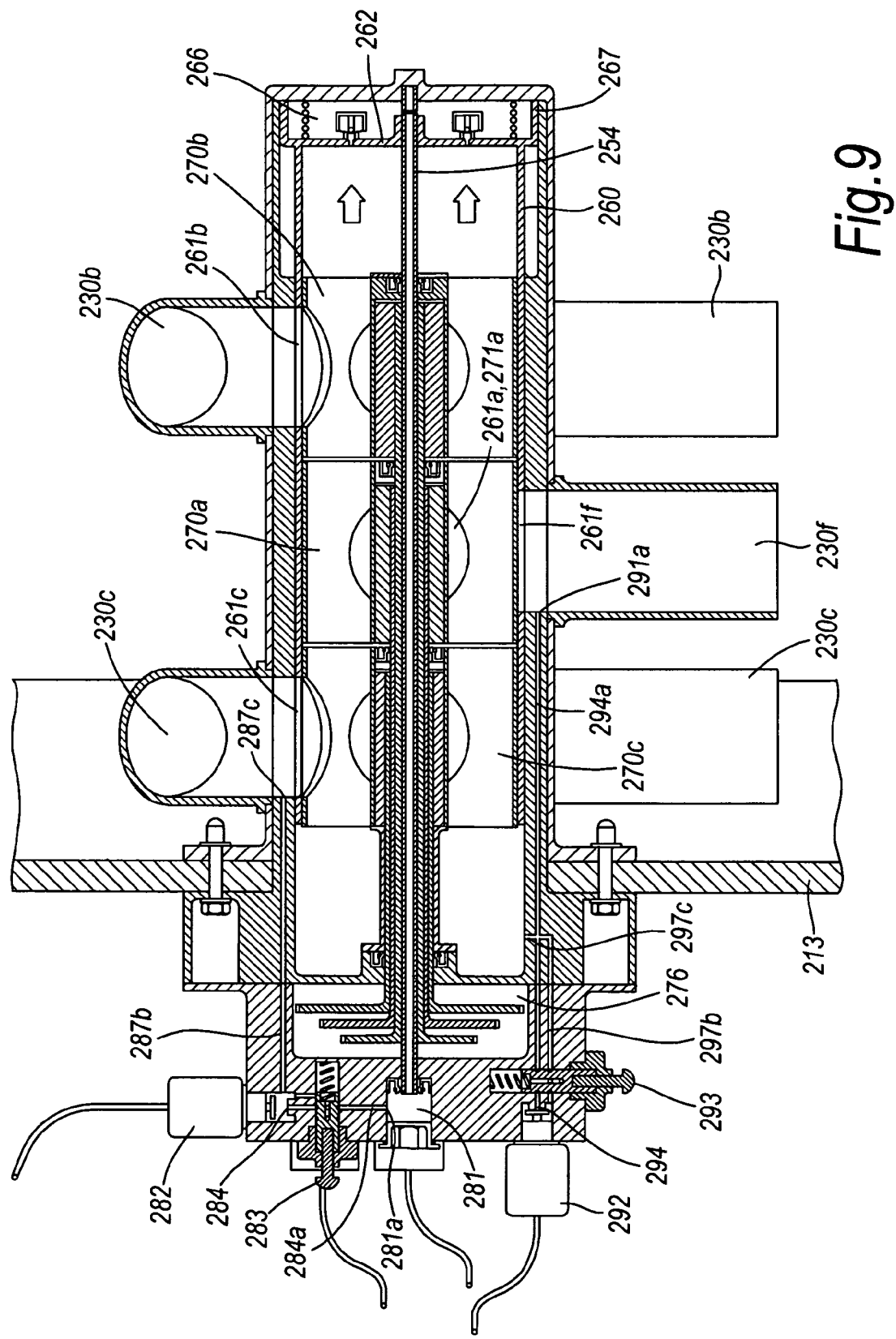
FIG. 9 shows a plan sectional view of the refuel valve assembly of FIG. 5, with the sleeve valve in the open position.

FIG. 9 shows a plan sectional view of a refuel valve assembly according to the first embodiment of the invention, with the sleeve valve in the open position. In this plan view, the enlarged section 267 behind the wall 262 of the sleeve valve 260 can be seen. As discussed previously, the enlarged section 267 has a larger cross-sectional area such that the cross-sectional area of the wall 262 is larger on the back side of the wall than the front side of the wall.

This plan view also shows the defuel line 230f connected to the near side of the refuel valve assembly 240. The left tank and centre tank delivery lines 230c, 230b can also more clearly be seen connected to the far side of the refuel valve assembly.

Figure 10A:
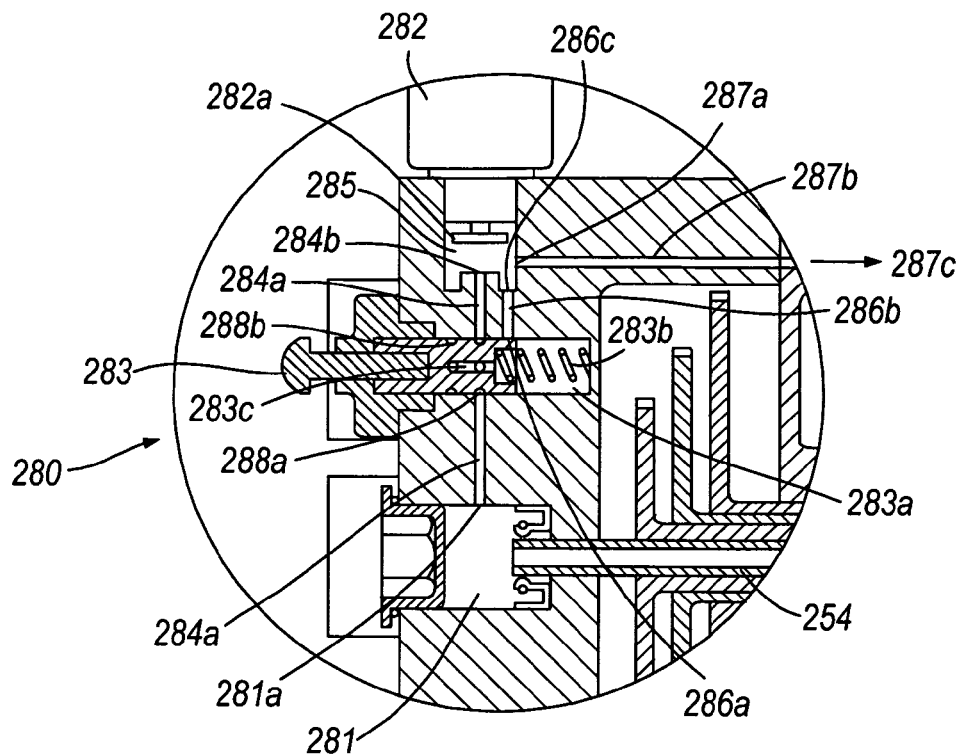
FIGS. 10a and 10b show an enlargement of the refuel solenoid assembly shown in FIG. 9.

A refuel solenoid assembly 280 will now be described in more detail, in relation to FIG. 9 and also FIGS. 10a and 10b, which show enlargements of the refuel solenoid assembly shown in FIG. 9.

The refuel solenoid assembly 280 includes a refuel solenoid chamber 281 connected to core channel tube 254, as previously discussed. Hence, the chamber 280 is supplied with fuel from the balance chamber 266.

The refuel solenoid assembly 280 also includes a refuel solenoid 282 and an associated plunger 282a, contained within a refuel solenoid plunger chamber 285. When the refuel solenoid 282 is supplied with power, the plunger 282a is retracted so as to lift up from a refuel solenoid seat 284 (as shown in FIGS. 9 and 10a). When there is no power supplied to the refuel solenoid, a compression spring (not shown) urges the plunger 282a to sit against the seat 284 (as shown in FIG. 10b).

There is a refuel solenoid chamber port 281a in the refuel solenoid chamber 281. Hence, fuel in the chamber 280 can leave via this port 281a. The port 281a leads to a refuel solenoid plunger seat channel 284a. This channel 284a leads to a refuel solenoid plunger seat port 284b on the refuel solenoid seat 284. Hence, fuel can flow from the refuel solenoid chamber 280 to the refuel solenoid plunger chamber 285 if the refuel solenoid is supplied with power and lifted from the seat 284 (as in FIG. 10a).

There is also a refuel solenoid plunger chamber outlet port 287a associated with the refuel solenoid plunger chamber

285. Hence, fuel in the plunger chamber 285 can flow through port 287a into a refuel solenoid outlet line 287b. This line 287b leads to a left tank delivery line port 287c, where it connects to the hole 251c in the outer casing 251 associated with the left tank delivery line 230c so that fuel in the plunger chamber 285 can flow into the left tank delivery line 230c and on into the left tank 211c.

The refuel solenoid assembly also includes a manual override plunger 283. The manual override plunger can be depressed at a first end from the front of the refuel valve assembly 240. The second end of the override plunger 283 is contained within an override plunger chamber 283a. A manual override plunger spring 283b is contained in the chamber 283a and acts against the override plunger 283 to bias it towards the front of the chamber 283a into a non-depressed position (as shown in FIGS. 9 and 10a).

The manual override plunger 283 has two grooves 288a, 288b around the circumference of the plunger 283. When the manual override plunger 283 is in its non-depressed position, the refuel solenoid plunger seat channel 284a connects to both sides of the innermost groove 288a so that fuel can flow around the manual override plunger 283.

The manual override plunger 283 also includes a bypass channel 283c, within the plunger bore, connecting the two circumferential grooves 288a, 288b.

Figure 10B:
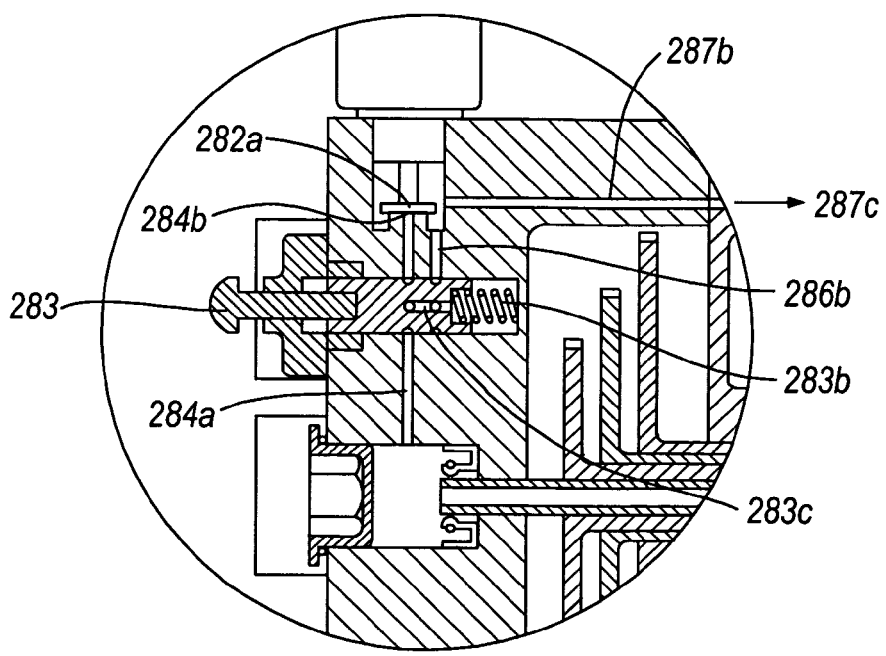

When the manual override plunger 283 is in its depressed position (as shown in FIG. 10b), the refuel solenoid plunger seat channel 284a connects to a first side of the outermost groove 288b so that fuel can flow into the bypass channel 283c and into the innermost groove 288a. When in the depressed position, the innermost groove 288a connects with a bypass channel port 286a so fuel can flow from the innermost groove 288a through the bypass channel port 286a, into a bypass channel outlet line 286b. This bypass channel outlet line 286b connects to the refuel solenoid plunger chamber 285. Hence, fuel can flow from the refuel solenoid seat channel 284a to the refuel solenoid plunger chamber 285 by a route that does not require the refuel solenoid plunger 282a to be raised from refuel solenoid plunger seat 284.

Figure 11A:
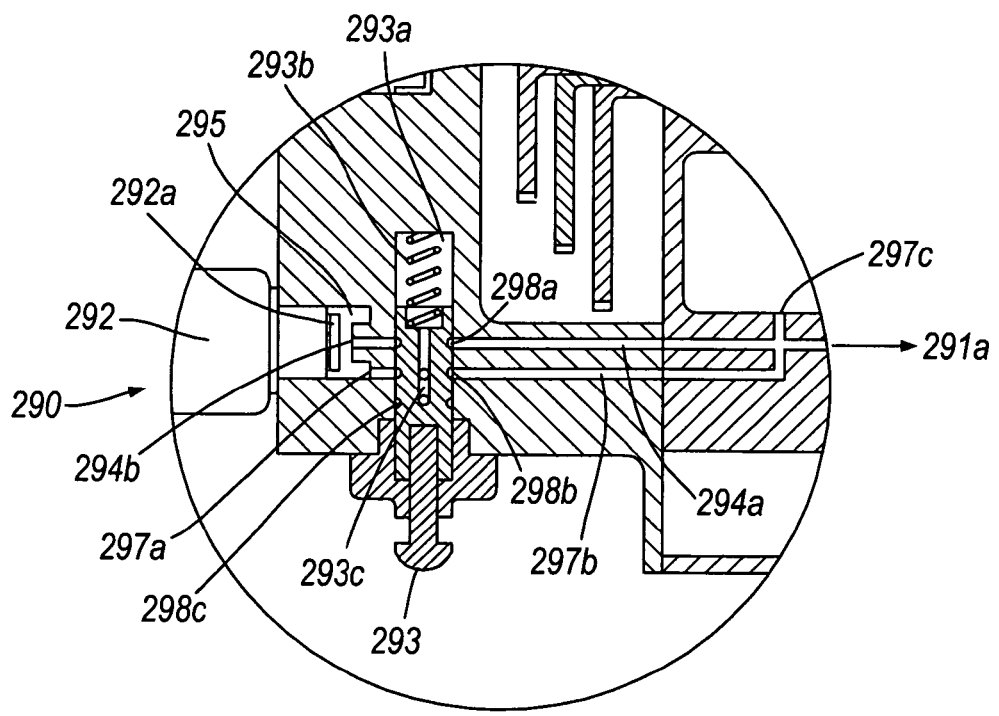
FIGS. 11a and 11b show an enlargement of the defuel solenoid assembly shown in FIG. 9.

The defuel solenoid assembly 290 will now be described, in relation to FIG. 9 and also FIGS. 11a and 11b, which show enlargements of the defuel solenoid assembly shown in FIG. 9.

The defuel solenoid assembly 290 includes a defuel solenoid 292 and an associated plunger 292a, contained within a defuel solenoid plunger chamber 295. When the defuel solenoid 292 is supplied with power, the plunger 292a is retracted so as to lift up from a defuel solenoid seat 294 (as shown in FIG. 11a). When there is no power supplied to the refuel solenoid, the plunger 282a sits against the seat 284 (as shown in FIGS. 9 and 11b).

There is a defuel solenoid port 291a in the hole 251f in the outer casing 251 associated with the defuel line 230f. This port 291a connects to a defuel solenoid plunger seat channel 294a, leading to a defuel solenoid plunger seat port 294b on the defuel solenoid plunger seat 294. Hence, fuel can flow from the defuel line 230f into the defuel solenoid plunger chamber 295 if the defuel solenoid is supplied with power and lifted from the seat 294 (as in FIG. 11a).

There is also a defuel solenoid plunger chamber outlet port 297a associated with the defuel solenoid plunger chamber 295. Hence, fuel in the plunger chamber 295 can flow through port 297a into a defuel solenoid outlet line 297b. This line 297b leads to a manifold shaft port 297c, where it connects into the front of the manifold shaft 241 so that fuel in the plunger chamber 295 can flow into the manifold shaft 241. This maintains fuel pressure on the sleeve valve 260 to urge it into its open (backwards most) position. This allows fuel to flow from the defuel line 230f into the manifold shaft 241 and then be defueled from the aircraft through the refuel coupling 220.

The defuel solenoid assembly also includes a manual override plunger 293. The manual override plunger can be depressed at a first end from the front of the refuel valve assembly 240. The second end of the override plunger 293 is contained within an override plunger chamber 293a. A manual override plunger spring 293b is contained in the chamber 293a and acts against the override plunger 293 to bias it towards the front of the chamber 293a into a non-depressed position (as shown in FIGS. 9 and 11a).

The manual override plunger 293 has three grooves 298a, 298b, 298c around the circumference of the plunger 293. When the manual override plunger 293 is in its non-depressed position (as shown in FIGS. 9 and 11a), the refuel solenoid plunger seat channel 294a connects to both sides of the innermost groove 298a so that fuel can flow around the manual override plunger 293. Also, the defuel solenoid outlet line 297b connects to both sides of the middle groove 298b so that fuel can flow around the manual override plunger 293.

The manual override plunger 293 also includes a bypass channel 293c, within the plunger bore, connecting the middle and outermost circumferential grooves, 298b and 298c.

Figure 11B:
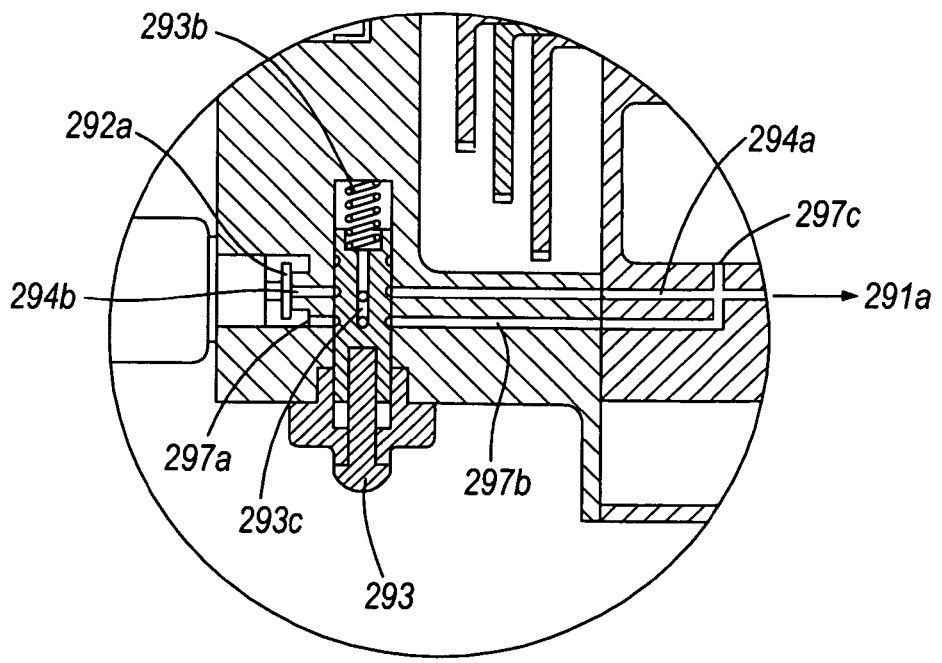

When the manual override plunger 293 is in its depressed position (as shown in FIG. 11b), the refuel solenoid plunger seat channel 294a connects to a first side of the middle groove 298b so that fuel can flow into the bypass channel 293c and into the outermost groove 298c. When in the depressed position, the outermost groove 298c connects to the defuel solenoid outlet line 297b. Hence, fuel can flow from the defuel solenoid seat channel 284a to the refuel solenoid outlet line 297b by a route that does not require the defuel solenoid plunger 292a to be raised from defuel solenoid plunger seat 294.

FIG. 12a shows a plan sectional view of the refuel valve assembly according to the first embodiment of the invention, with the sleeve valve in the closed position. This view shows the front of the sleeve valve 260 abutting the front wall of the inner casing 250 in its forward most (closed) position. The holes 261a, 261b, 261c, 261f do not line up with the corresponding holes in the inner 250 and outer casing 251. This means that no matter what position the annular valves 270 are in, no fuel can flow from the manifold shaft 241 to the delivery or defuel lines 230.

In this closed position, the spring 265 in the balance chamber 266 is in its natural (non-compressed) state.

Figure 12B:
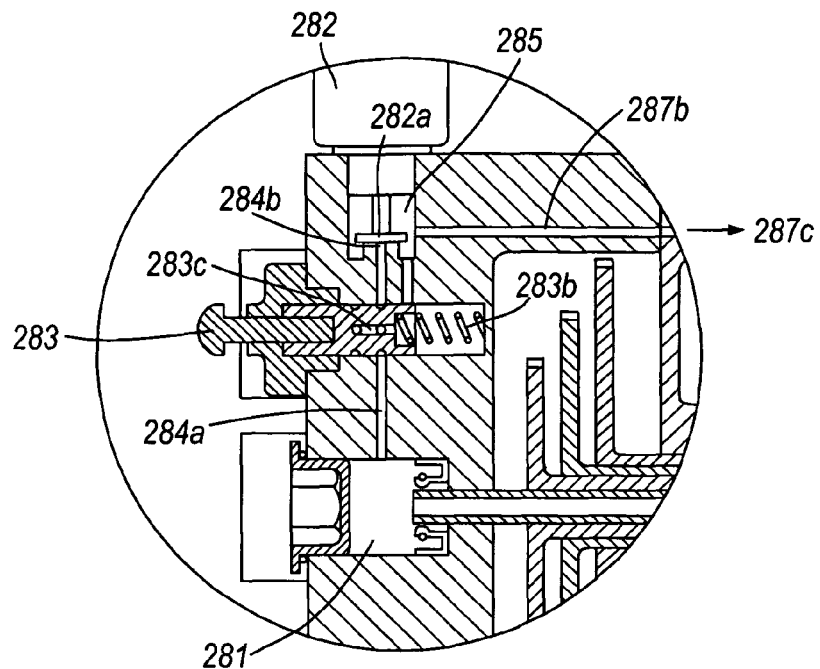

FIG. 12b shows an enlargement of the refuel solenoid assembly shown in FIG. 12a. Here, it can be seen that the refuel solenoid 282 is not being supplied with power and so the refuel solenoid plunger 282a is closed against the refuel solenoid plunger seat port 284b on the refuel solenoid plunger seat 284. Hence, fuel flow into the refuel solenoid plunger chamber 285 via circumferential innermost groove 288a is closed off. In addition, no fuel can flow to the refuel solenoid plunger chamber 285 via circumferential outermost groove 288b either, as the manual override plunger 283 is not depressed. This means that fuel is able to build up in the balance chamber 266, as described above. This pushes the sleeve valve 260 into its closed position.

Figure 13:
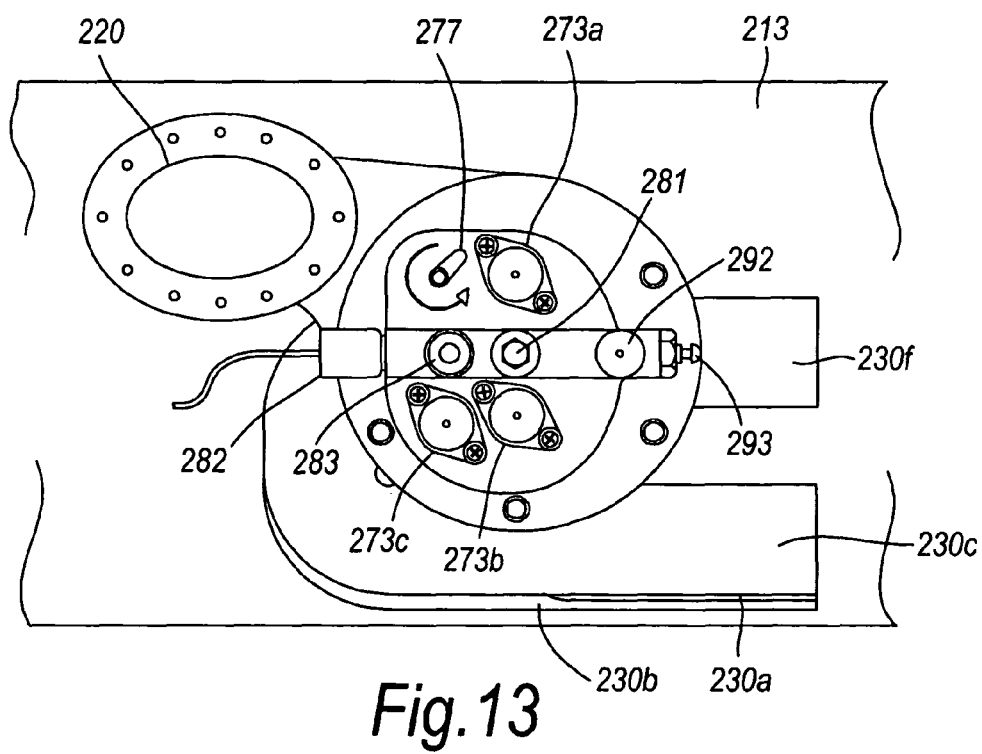
FIG. 13 shows a front end view of the refuel valve assembly, of FIG. 5.

FIG. 13 shows a front end view of the refuel valve assembly, according to the first embodiment of the invention. This view shows the position of the various components of the refuel valve assembly 240 accessible from the front of the assembly. In particular, the refuel and defuel solenoids 282, 292 can be seen, together with the associated manual override plungers 283, 293. There is also a screw in the middle of the front of the assembly that can be unscrewed to access the refuel solenoid chamber 281.

The motors 273 for controlling the spur gears 272 are also shown. There is also a manual rotor valve alignment lever 277. This lever can be manually turned to align the right tank annular valve 270a so that the hole 271a in it aligns with the defuel line 230f.

It can be seen in the Figures, especially FIG. 6, that inner casing 250 forms a canister around the annular valves 270 and sleeve valve 260. The motor drive head 242, including the spur gear motors 273, is attached to the front of the inner casing 250 by screws 243 attaching the motor drive head 242 to the front of the inner casing 250 and the wing spar 213.

When the aircraft is not being refuelled, there is no fuel pressure through the refuel coupling 220 and into the manifold shaft 241. In this situation, spring 265 urges the shut-off sleeve valve 260 into its closed position.

When the aircraft tanks 211 are to be refuelled, fuel is supplied into the manifold shaft 241 through refuel coupling 220. Some of the fuel in the manifold shaft 241, flows through non-return valves 264a, 264b into the balance chamber 266 until the pressure either side of the wall 262 is equal. This urges the front of the sleeve valve 260 against the front end of the inner casing 250, as the rear of the wall 262 has a larger area (and hence a larger force acting on it) than the front of the wall 262.

The fuel also flows into the hole 254a in the core channel tube 254 into the core channel tube 254. It then flows into the refuel solenoid chamber 281, through port 281a and into refuel solenoid plunger seat channel 284a. If the refuel solenoid has power, it then also flows through refuel solenoid plunger seat port 284b and into refuel solenoid plunger chamber 285. It then flows through the refuel solenoid plunger chamber outlet port 287a, into the refuel solenoid outlet line 287b. It then flows out of the left tank delivery line port 287c and into the left tank delivery line 230c and on into the left tank 211c.

It is to be noted that although the fuel pressure in the refuel solenoid plunger chamber 285 is relatively high (in the region of 50 psi), the diameter of the refuel solenoid plunger seat port 284b is small and so the force on the refuel solenoid plunger 282a is also small. Therefore, a constant duty solenoid that has a low current consumption and low heat output can be used for the refuel solenoid 282.

This fuel flow through the refuel solenoid outlet line 287b ensures that fuel pressure does not build up in the balance chamber 266, due to fuel flowing through the non-return valves 264a, 264b. Hence, the pressure is reduced in the balance chamber 266 and therefore shut-off sleeve valve 260 is urged into its open (backwards most) position so that holes 261 in the sleeve valve 260 line up with the various delivery lines 230.

This allows fuel to flow through the sleeve valve holes 261 into the various delivery lines 230 depending on the position of the annular valves 270. For example, if fuel flow to the right tank 211a is desired, motor 273a will control spur gear 272a to rotate annular valve 270a so that hole 271a in it is at least partially lined up with the right tank delivery line 230a. The three annular valves 270a, 270b, 270c can be controlled independently by the three separate spur gears 272a, 272b, 272c and motors 273a, 273b, 273c. The annular valves 270 can also be controlled so that the flow to each tank can be varied from full flow, where the hole 271 in the valve 270 is fully aligned with the delivery line 230, as shown in FIGS. 7a and 8c, to no flow, where the hole 271 in the valve 270 is not at all aligned with the delivery line 230, as shown in FIGS. 7c, 8a and 8d.

Upon closing of each annular valve 270, a non-return valve (not shown) in an air feed line connected to the corresponding delivery line 230 allows air to flow into the delivery line 230 when there is low pressure in the delivery line 230. This urges the remaining fuel in the delivery line 230 to drain into the relevant tank 211. The air feed line is connected to a vent/surge tank so that the air fed into the delivery line 230 comes from the vent/surge tank. The non-return valve ensures that fuel does not flow from the delivery line 230 to the vent/surge tank.

The spur gear motors 273 are controlled via a refuel computer that interprets data, from fuel sensors in the different fuel tanks 211. Hence, the position of each annular valve 270 is controlled based on the refuel requirements of the corresponding tank 211. In this way the flow of fuel can be modulated throughout the refuel period such as to optimise the flow of fuel according to the local ambient conditions of temperature and pressure. Thus the annular valves 270 provide a means of opening and closing fuel flow and replace the function of the fixed orifice plate restrictors 31a, 31b of the prior art gallery system. This means that no restrictors are required in the delivery lines 230. This allows the fuel time to "relax" in the delivery lines 230 after passing through the manifold shaft 241. Hence, the fuel can "relax" over almost the entire length of the delivery lines 230 and the ESD in the fuel can reduce significantly. It also means that, for a given flow rate, the flow rate can be increased to take advantage of the additional "relaxing" length.

In addition, as each delivery line 230 is continuous from the manifold shaft 241 to the tanks 211, the delivery line 230 does not need as many connector joints, as in the prior art gallery system. In addition, each delivery line 230 is flexible.

Hence, the refuel valve assembly 240 of embodiments of the present invention does not significantly increase the charge density of the fuel in the delivery lines 230. Hence, the ESD in the fuel can be reduced. This means the fuel flow rate does not have to be slowed down (and can be increased) in order to reduce the risk of fuel vapour ignition.

Another advantage of embodiments of the present invention, is that the annular valves 270 that control the fuel flow are located very close to the refuel coupling 220. Hence, any upstream surge pressures produced by closing of the annular valves 270, are contained within the manifold shaft 241. The manifold shaft 241 can simply be sized in order to cope with these pressures. The delivery lines 230 are not subjected to the surge pressure that the delivery lines of the prior art gallery system experience and so the delivery lines 230 of embodiments of the present invention can have a lower weight than in the prior art. They can also be more flexible.

In addition, downstream surge pressures are prevented by the addition of the air feed lines connected to each delivery line 230.

In addition, as the variable opening annular valves 270 are automated, the surge pressures can be managed and minimised.

When refuelling, a refuel circuit is used to provide power to the refuel solenoid and also to the refuel monitoring and automatic control apparatus. Hence, if power was lost partway though refuelling, the fuel operator would not know how much fuel had been delivered or how much fuel capacity was left in each of the tanks (other than from onboard aircraft sensors and bowser/hydrant sensors). If refuel was allowed to continue, there would be a greater risk of fuel overspill.

If power is lost to the refuel circuit, it is also lost to the refuel solenoid 282. This means that the refuel solenoid plunger 282a will automatically return under the action of a compression spring to sit against refuel solenoid plunger seat 284 and prevent fuel from flowing from the balance chamber 266 to the refuel solenoid outlet line 287b. Hence, fuel would build up in the balance chamber 266 until the fuel pressure in the balance chamber 266 equalled that in the rest of the manifold shaft 241. The enlarged portion 267 at the back of the wall of the sleeve valve 260 means that the cross-sectional area of the wall 262 is larger on the back side of the wall than the front side of the wall. Hence, with equal fuel pressure in the balance chamber 266 and the rest of the manifold shaft 241, there would be a force acting frontwards on the wall 262 of the sleeve valve 260 to move the sleeve valve into its closed (forwards most) position. Hence, fuel can no longer flow from the manifold shaft 241 to the tanks 211.

If there is power failure, it is still possible to refuel the aircraft by depressing the refuel solenoid manual plunger 283. As the plunger 283 is biased by a spring 283a, it is necessary to manually depress the plunger 283 to hold it in its override position throughout refuel. When the manual plunger 283 is depressed, the refuel solenoid plunger seat channel 284a connects to a first side of the outermost groove 288b so that fuel can flow into the bypass channel 283c, into the innermost groove 288a, into bypass channel port 286a, into a bypass channel outlet line 286b and then into the refuel solenoid plunger chamber 285.

Hence, fuel can flow from the refuel solenoid seat channel 284a to the refuel solenoid plunger chamber 285 by a route that does not require the refuel solenoid plunger 282a to be raised from refuel solenoid plunger seat 284. This allows fuel to flow from the balance chamber 266, through core channel tube 254 and into the left tank delivery line 230c. Hence, fuel does not build up in the balance chamber 266, due to fuel flowing through the non-return valves 264a, 264b. Hence, the pressure is reduced in the balance chamber 266 and therefore shut-off sleeve valve 260 is urged into its open (backwards most) position so that holes 261 in the sleeve valve 260 line up with the various delivery lines 230. This allows fuel to flow through the sleeve valve holes 261 into the various delivery lines 230 depending on the position of the annular valves 270, as previously discussed.

When the aircraft tanks 211 are to be defuelled, the right tank annular valve 270a is rotated so that the hole 271a in it is lined up with the attachment point of the defuel line 230f. This is done using the manual rotor valve alignment lever 277. Alternatively, if the power is available and the refuel computer is online this can also be done from an electronic command initiated from the refuel computer. The defuel solenoid 292 is then activated so that the defuel solenoid plunger 292a lifts up from defuel solenoid plunger seat 294.

Fuel is pumped from a fuel bowser, in order for pressure of fuel to build up in a bowser line to the refuel coupling 220 and manifold shaft 241. The bowser pump would then be switched off. This "pre-primes" the bowser line with fuel and prevents fuel defueling out to the bowser line. This also enables the pressure in the manifold shaft 241 to be maintained during defuel so that the sleeve valve 260 does not return to the closed position.

An engine feed pump is then operated to provide fuel flow from the engine feed line to the defuel line 230f.

Some fuel in the defuel line 230f flows into defuel solenoid port 291a, through defuel plunger seat channel 294a and out into the defuel solenoid plunger chamber 295 through defuel solenoid plunger port 294b. This fuel then flows out of the chamber 292 through plunger chamber outlet port 297a, into outlet line 297b and out into the manifold shaft 241 through defuel line port 297c. This creates the fuel pressure required to urge the shut-off sleeve valve 260 into its open (backwards most) position so that holes 261 in the sleeve valve 260 line up with the various delivery lines 230. In particular, hole 261f in the sleeve valve 260 is lined up defuel line 230f.

This allows fuel to flow through the sleeve valve hole 261f from the defuel line 230f into the manifold shaft 241. The speed of defuel can be controlled by adjusting the position of the annular valve 270a. For example, if maximum defuel flow is desired, motor 273a will control spur gear 272a to rotate annular valve 270a so that hole 271a in it is at fully lined up with the defuel line 230f, as shown in FIG. 8d. The annular valve 270a can also be positioned so that the defuel flow rate is reduced, by only partially lining up hole 271a with the defuel line 230f. Importantly, a sufficient pressure must be maintained in the manifold shaft 241 to keep the sleeve valve 260 open. Hence, the annular valve 270a will be rotated to an alignment that generates adequate pressure and provide sufficient flow of fuel to the bowser. It may also be required to place a restrictor between the bowser and the valve assembly to maintain enough pressure in the manifold shaft 241. The limiting factor for fuel pressure and flow is the engine feed pumps but these are generally powerful and can deliver high flow rates at 30 to 40 psi. As the defuel operation is a maintenance operation only, time is not an overriding factor, so the defuel time can be much slower than the refuel time.

Fuel in the manifold shaft 241 can flow out of the manifold shaft 241 through refuel coupling 220 into the bowser line.

When defuelling, a defuel circuit is used to provide power to the defuel solenoid 292. If power is lost to the defuel circuit, it is also lost to the defuel solenoid 292. This means that the defuel solenoid plunger 292a will automatically return under the action of a compression spring to sit against defuel solenoid plunger seat 294 and prevent fuel from flowing from the defuel line 230f to the defuel solenoid outlet line 297b and into the manifold shaft 241. If the engine pumps are still powered, fuel will continue to flow into the manifold shaft 241. Fuel will also flow through non-return valves 264a, 264b into the balance chamber 260, causing the sleeve valve 260 to close. Therefore, fuel will no longer flow into the manifold shaft 241 from the defuel line 230f.

If there is power failure, it is still possible to defuel the aircraft, for example for maintenance, by using the manual rotor valve alignment lever 277 and depressing defuel solenoid manual plunger 293. As the plunger 293 is biased by a spring 293a, it is necessary to manually depress the plunger 293 to hold it in its override position throughout defuel. When the manual plunger 293 is depressed, the defuel solenoid plunger seat channel 294a connects to a first side of the middle groove 298b so that fuel can flow into the bypass channel 293c, into the outermost groove 298c, into the defuel solenoid outlet line 297b.

Hence, fuel can flow from the defuel solenoid seat channel 294a to the defuel solenoid outlet line 297b by a route that does not require the defuel solenoid plunger 292a to be raised from defuel solenoid plunger seat 294. This allows fuel to flow from the defuel line 230f into the manifold shaft 241. Hence, shut-off sleeve valve 260 is urged into its open (backwards most) position so that holes 261 in the sleeve valve 260 line up with the various delivery lines 230.

An alternative way of defueling the aircraft is to align the various annular valves 270a, 270b, 270c with the respective refuel lines 230a, 230b, 230c. The sleeve valve 260 can then be forced into its open position by, for example, depressing a sprung loaded plunger or by operating a screw jack (not shown). Fuel could then be "sucked" out of the aircraft tanks (via the refuel lines 230 and the manifold shaft 241) using suction/reverse pressure from a fuel bowser connected to the refuel coupling 220.

If the refuel valve assembly 240 needs to be repaired or replaced, the motor drive head 242 is removed by unscrewing screws 243. This allows easy access from in front of the wing spar 213 to the motors 273, if they need replacing or repairing, for example. There is no need to gain access to them through a fuel tank.

The inner casing 250 can then be detached from the wing spar by unscrewing the inner casing fasteners. Then, the inner casing 250 can be slid out of the outer casing 251. The inner casing 250 contains the annular valves 270, sleeve valve 260, spur gears 272 etc. inside it. Hence, the valves etc. can be repaired or replaced and the inner casing 250 unit repaired or replaced as a LRU (Line Replaceable Unit). There is no need to gain access to the refuel valve assembly 240 through a fuel tank. In addition, the inner casing 250 can be removed and modified annular valves 370 and sleeve valve 360 can be installed in order to provide a refuel valve assembly 340 according to a second embodiment of the invention, as described below.

The outer casing 251 is connected to the delivery lines 230 and can be accessed through the fuel tanks 211.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, as mentioned earlier, the valve holes may not be circular and could be any required shape, including rectangular, square, triangular or any irregular shape.

Similarly, the inlet of the refuel coupling may not be elliptical. However, having an elliptical inlet to the refuel coupling allows the dimension of the refuel hole 215 in the spar 213 to be smaller in the vertical direction than it would be for a circular refuel hole 215, for example. In particular, it is important that the refuel hole 215 in the spar 213 does not impact on the spar caps (including the relatively large radius of the spar caps) of the spar 213. A circular refuel hole 215 would be inefficient compared to an elliptical refuel hole 215.

FIG. 3b shows a plan view of an aircraft wing 210 employing a refuel valve assembly 340 according to a second embodiment of the invention. Where reference numerals are the same as that used for the first embodiment (210, 220, 230 etc.), the item is the same as the first embodiment. Slightly different, or additional, items will be described below with reference numerals 310, 320, 330 etc.

In this second embodiment, the refuel valve assembly 340 has five outlets, with the same three outlets as refuel valve assembly 240 in FIG. 3a and an additional two outlets on the other side of the refuel valve assembly. The two outlets on the other side of the refuel valve assembly 340 lead to separate delivery lines 330d, and 330e. Delivery line 330d leads to a first auxiliary tank 311d and delivery line 330e leads to a second auxiliary tank 311e of the aircraft.

In this second embodiment, as shown in FIG. 3b, the wing front spar 213 has a single refuel hole 215, as for the first embodiment of FIG. 3a and as shown in FIG. 4.

Figure 14:
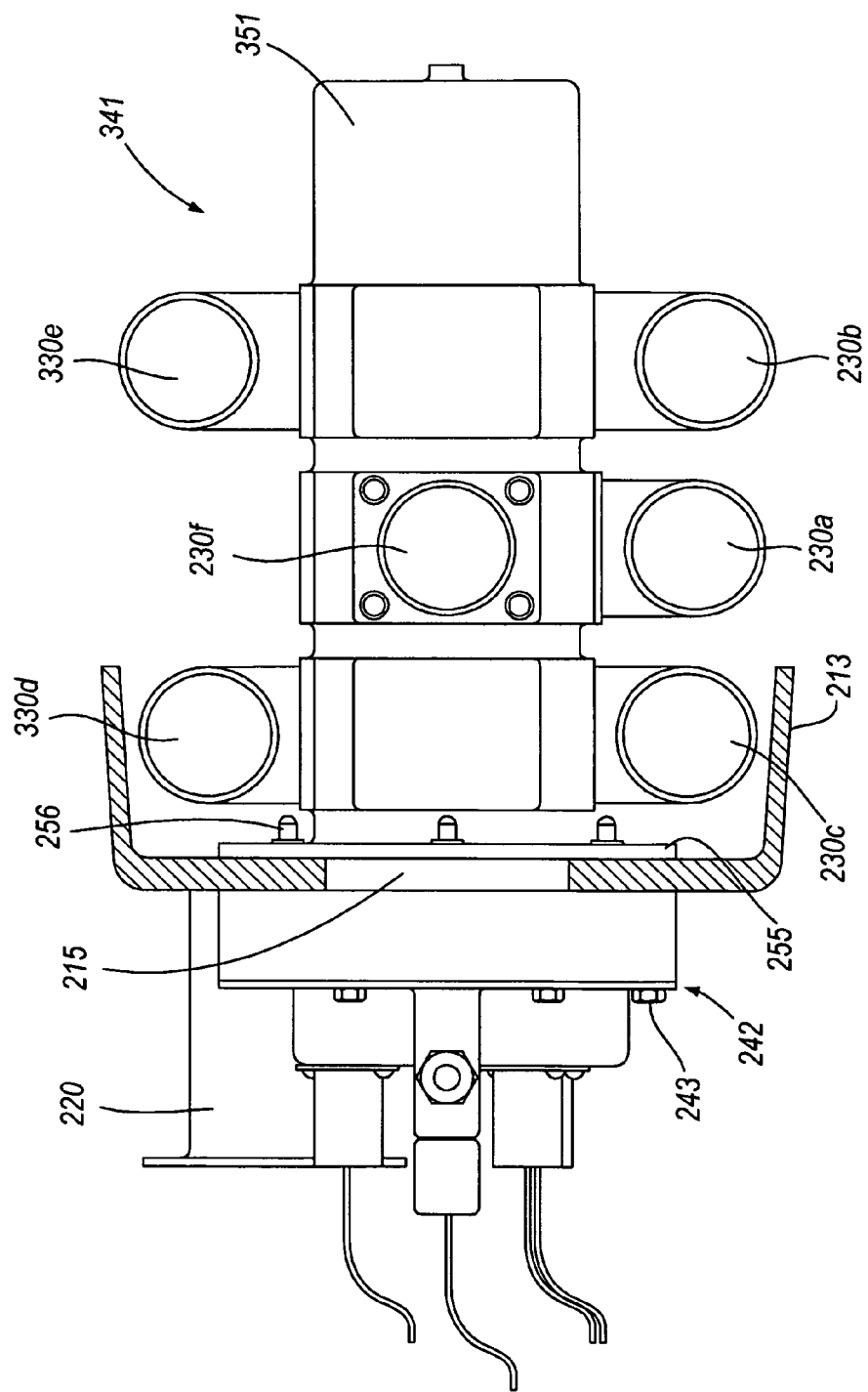
FIG. 14 shows side view of a refuel valve assembly according to a second embodiment of the invention.

FIG. 14 shows a side view of the refuel valve assembly 340. As can be seen in this Figure, the right tank, left tank and centre tank delivery lines and defuel line 230a, 230c, 230b, 230f are attached to the manifold in the same way as in FIG. 5.

In addition, there is an attachment point for a first auxiliary tank delivery line 330d and a corresponding hole 351d in the outer casing 351 and corresponding hole 350d in the inner casing 350. The first auxiliary tank delivery line 330d is attached to the front section of the manifold 341, at the same point along the manifold 341 as the left tank delivery line 230a. However, the first auxiliary tank delivery line 330d is attached at 90 degrees to the left tank delivery line 230a, on the top side as viewed in FIG. 14.

There is also an attachment point for a second auxiliary tank delivery line 330e and a corresponding hole 351e in the outer casing 351 and corresponding hole 350e in the inner casing 350. The second auxiliary tank delivery line 330e is attached to the back section of the manifold 341, at the same point along the manifold 341 as the centre tank delivery line 230b. However, the second auxiliary tank delivery line 330e is attached at 90 degrees to the centre tank delivery line 230b, on the top side as viewed in FIG. 14.

The sleeve valve 360 has corresponding additional holes 361d, 361e that line up with the inner and outer casing holes 350d, 350e, 351d, 351e when the sleeve valve 360 is in the open (backwards most) position.

FIGS. 16a to 16g show a cross section through the left tank annular valve 370c. They show the annular valve 370c inside the sleeve valve 260 and inner and outer casing 350, 351. The annular valve 370c is very similar to the left tank annular valve 270c of the first embodiment, but with a second hole 371d, on an opposite side of one of the legs 275c of the annular valve 370c, to the first hole 271c. The left tank annular valve 370c can be rotated differently to also control fuel flow to the first auxiliary tank delivery line 330d.

Figure 16A:
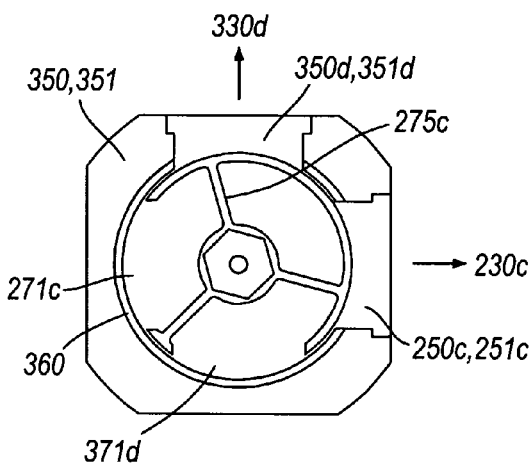
FIGS. 16a, 16b, 16c, 16d, 16e, 16f and 16g show cross-sectional views through a left tank annular valve as used in the refuel valve assembly of FIG. 14.

In FIG. 16a, the annular valve 370c is rotated in a position such that the holes 271c, 371d in the annular valve are both not at all lined up with either the holes leading to the left tank delivery line 230c or the first auxiliary tank delivery line 330d. Here, there can be no fuel flow through the annular valve 370a. However, as the sleeve valve 260 is in the closed position so that holes 251c, 351d, 250c, 350d are closed off, there can be no fuel flow to the left tank or first auxiliary tank delivery lines 230c, 330d, independent of the rotation position of the annular valve 370c.

Figure 16B:
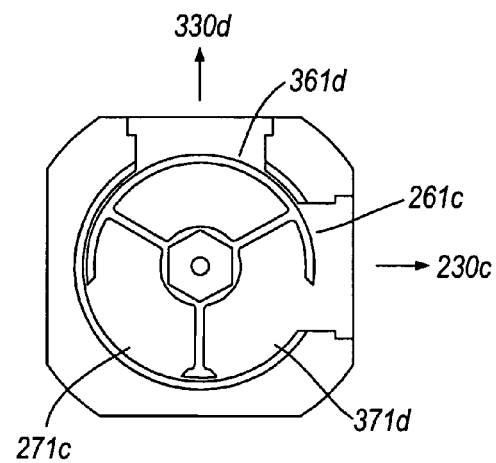

In FIG. 16b, the sleeve valve 260 is in the open position so that holes 261c, 361d in the sleeve valve 360 is adjacent the corresponding holes 250c, 251c and 350d, 351d in the inner and outer casing. The annular valve 370c is rotated in a position such that the hole 371d in the annular valve is half lined up with the hole leading to the left tank delivery line 230c. Here, the fuel flow to the left tank is limited to less than a quarter of the maximum fuel flow. The hole 271c is not at all lined up with the holes leading to the first auxiliary tank delivery line 330d. Here, there is no fuel flow to the first auxiliary tank delivery line 330d.

Figure 15:
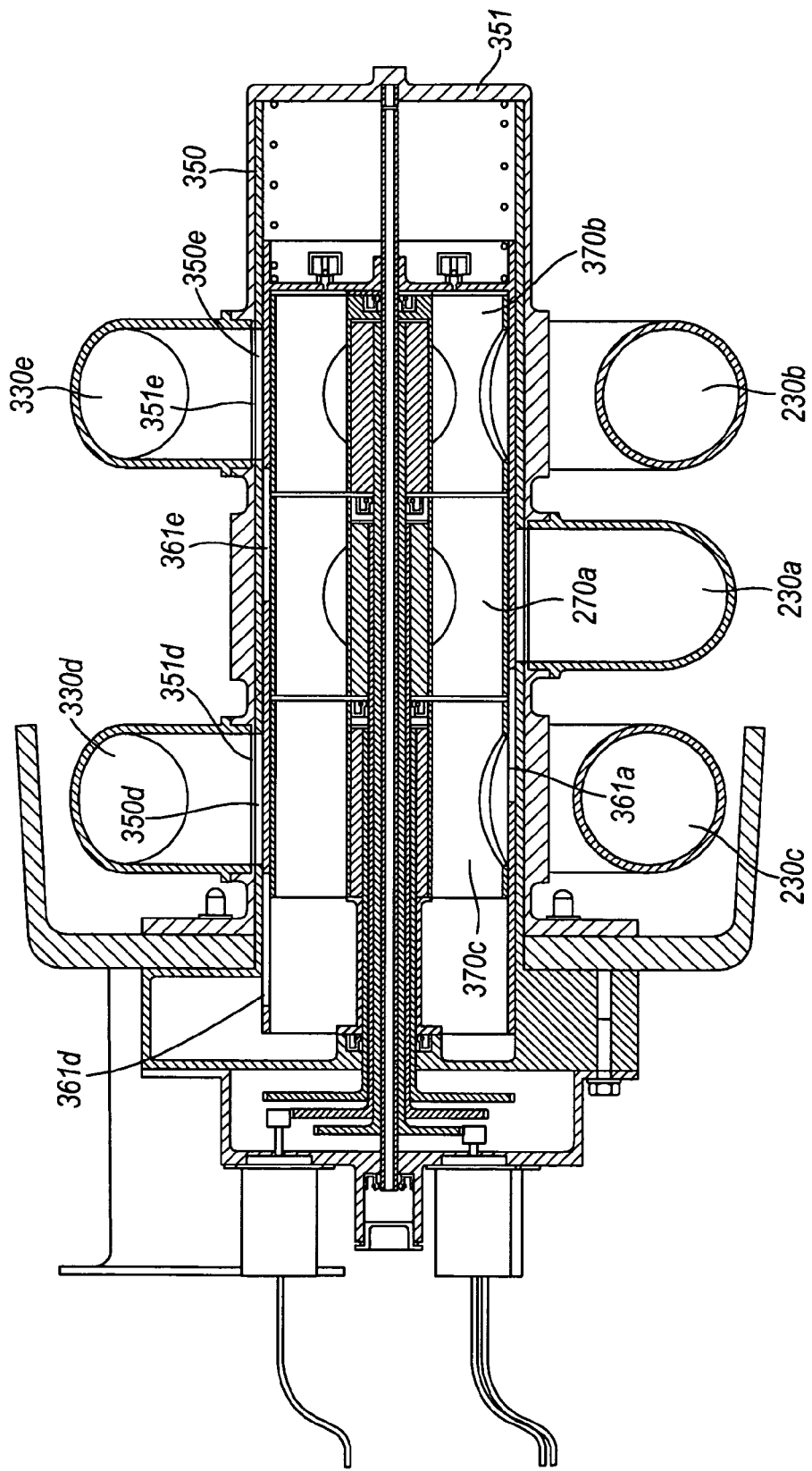
FIG. 15 shows a side sectional view of the refuel valve assembly of FIG. 14, with the sleeve valve in the closed position.
Figure 16C:
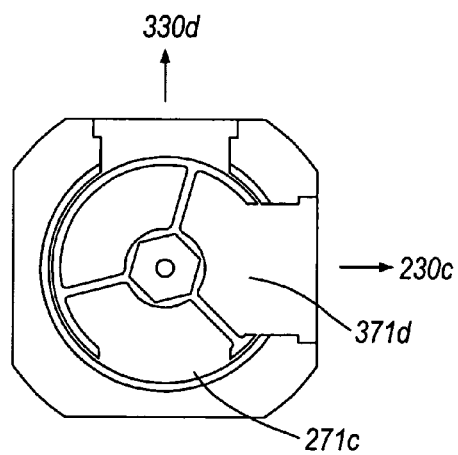

In FIG. 16c, the sleeve valve 360 is in the same open position. The annular valve 370c is rotated in a position such that the hole 371d in the annular valve is fully lined up with the holes leading to the left tank delivery line 230c. In other words the hole 371d is facing the far side of the manifold shaft 241 in FIG. 15. This allows maximum fuel flow through the annular valve 370c to left tank delivery line 230c. The hole 271c is not at all lined up with the holes leading to the first auxiliary tank delivery line 330d. Here, there is no fuel flow to the first auxiliary tank delivery line 330d.

Figure 16D:
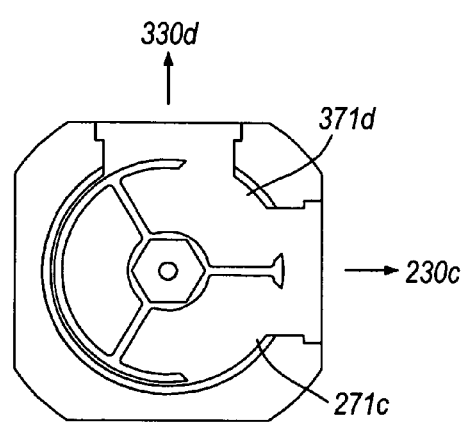

In FIG. 16d, the sleeve valve 360 is in the same open position. The annular valve 370c is rotated in a position such that the hole 371d in the annular valve is half lined up with the hole leading to the first auxiliary tank delivery line 330d. Here, the fuel flow to the first auxiliary tank 311d is limited to less than a quarter of the maximum fuel flow. The hole 371d is also half lined up with the hole leading to the left tank delivery line 230c. The other hole 271c in the annular valve is half lined up with the hole leading to the left tank delivery line 230c. Here, the fuel flow to the left tank 211c is limited to less than maximum fuel flow, due to leg 275c partially blocking the holes leading to the left tank delivery line 230c and the shape that the two circular holes 271c, 271d make in relation to the aperture 261c of the delivery line 230c.

Figure 16E:
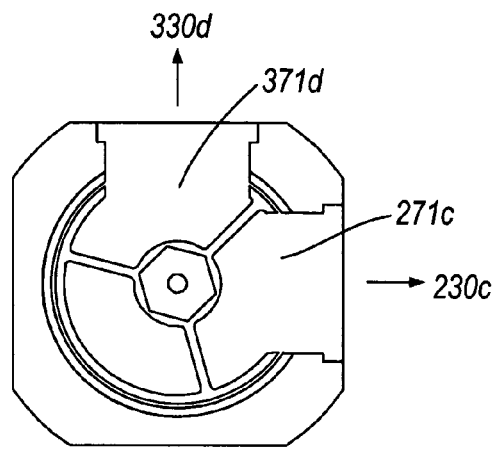

In FIG. 16e, the sleeve valve 360 is in the same open position. The annular valve 370c is rotated in a position such that the hole 371d in the annular valve is fully lined up with the hole leading to the first auxiliary tank delivery line 330d. In other words the hole 371d is facing the top side of the manifold shaft 341 in FIG. 15. This allows maximum fuel flow through the annular valve 370c to first auxiliary tank delivery line 330d. Other hole 271c in the annular valve is fully lined up with the hole leading to the left tank delivery line 230c. In other words the hole 271c is facing the far side of the manifold shaft 341 in FIG. 15. This allows maximum fuel flow through the annular valve 370c to left tank delivery line 230c.

Figure 16F:
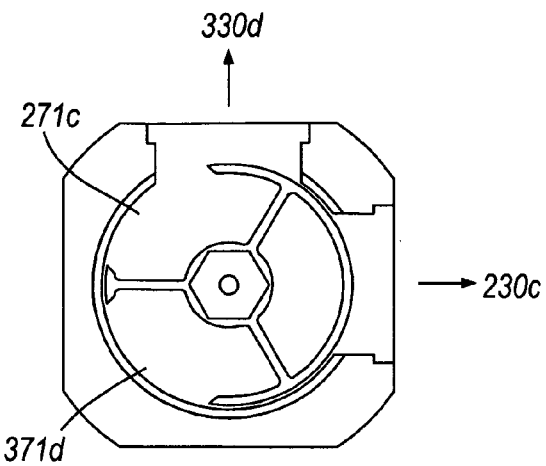

In FIG. 16f, the sleeve valve 360 is in the same open position. The annular valve 370c is rotated in a position such that the hole 271c in the annular valve is half lined up with the hole leading to the first auxiliary tank delivery line 330d. Here, the fuel flow to the first auxiliary tank 311d is limited to about less than a quarter of the maximum fuel flow. Hole 371d in the annular valve is not lined up with the holes leading to the left tank or the first auxiliary tank delivery lines 230c, 330d. Here, there is no fuel flow to the left tank delivery line 230c.

Figure 16G:
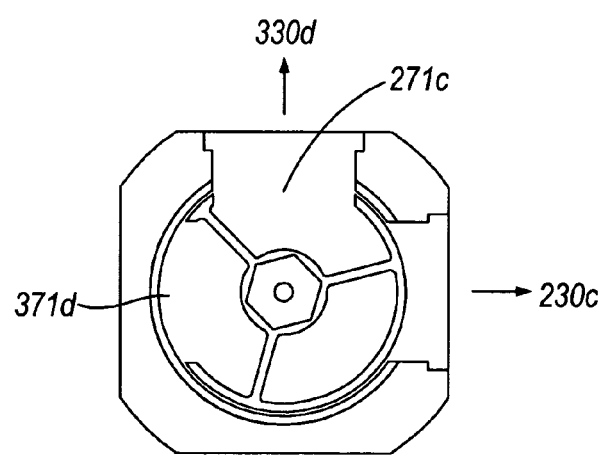

In FIG. 16g, the sleeve valve 360 is in the same open position. The annular valve 370c is rotated in a position such that the hole 271c in the annular valve is fully lined up with the hole leading to the first auxiliary tank delivery line 330d. In other words the hole 271c is facing the top side of the manifold shaft 341 in FIG. 15. This allows maximum fuel flow through the annular valve 370c to first auxiliary tank delivery line 230c. The hole 371d in the annular valve is not lined up with the holes leading to the left tank delivery line 230c. Here, there is no fuel flow to the left tank delivery line 230c.

The centre tank annular valve 330b is very similar to the left tank annular valve 330c, also having two holes 331b, 331e either side of one of the legs 275b of the annular valve 370b.

Therefore, in use, the refuel valve assembly 340 of the second embodiment is able to control fuel flow to an additional two auxiliary tank delivery lines 330d, 330e. Therefore, it can be used to refuel first and second auxiliary tanks 311d, 311e in addition to the left, centre and right tanks 211a, 211b, 211c. These additional two tanks 311d, 311e can be refuelled (and defuelled) while still having only a single hole 215 in the wing spar 213.

It is also possible to have more than two auxiliary tanks, located in a cargo hold of the aircraft. This is because, in a typical single-aisle passenger aircraft, a typical auxiliary tank has a volume of approximately a third of that of either the right, left or centre tank 211a, 211c, 211b so that three auxiliary tanks could be filled in approximately the same time as a main tank. For example, the left tank annular valve 370c could be used to control flow of fuel to an additional two auxiliary tanks. Hence, the left tank annular valve 370c would control fuel flow to the left tank 211c via the 271c in the annular valve 370c and control fuel flow to the first auxiliary tank 311d and an additional two auxiliary tanks via hole 371d in the annular valve 370c. The centre tank annular valve 370b could similarly be used to control fuel flow to the centre tank 211b via hole 371b in the annular valve 371b and control fuel flow to the second auxiliary tank 311e and an additional two auxiliary tanks via hole 371e in the annular valve 370b. There may be transfer pumps to transfer fuel from a first auxiliary tank 211d, 211e on a particular delivery line 230d, 230e to a second auxiliary tank on the delivery line. There may also be a transfer pump between the second and third auxiliary tanks on the delivery line. Hence, up to six auxiliary tanks could be refuelled using a refuel valve assembly according to embodiments of the invention.

As an alternative, wiper seals may be used, in addition to or instead of the low friction coating, in between the sleeve valve 260 and the annular valves 270.

FIG. 3c shows a plan view of an aircraft wing 410 employing a refuel valve assembly 440 according to a third embodiment of the invention. Where reference numerals are the same as that used for the first embodiment (210, 220, 230 etc.) or second embodiment (310, 320, 330 etc.), the item is the same as the first or second embodiment. Slightly different, or additional, items will be described below with reference numerals 410, 420, 430 etc.

In this third embodiment, the refuel valve assembly 440 is located on the starboard-side of the aircraft and has the same three outlets as the refuel valve assembly 240 in FIG. 3a. It also has an additional inlet 440a on an outer, back end of the refuel valve assembly 440. This end inlet leads to a separate delivery line 430g. Delivery line 430g leads to a refuel coupling 450 on the wing leading edge on the port-side of the aircraft. The fuel travels across the wing from the refuel coupling 450 on the port-side to the refuel coupling on the starboard side through delivery line 430g. The fuel is then distributed to the individual tanks through the refuel valve assembly 440 on the starboard-side. Hence, refuel to the various tanks 211a, 211b, 211c can take place from either side of the aircraft although the control of the refuel is still managed by the valve assembly located in the starboard wing.

In the embodiment of FIG. 3c, the wing 410 has two refuel holes 415a, 415b in the front spars 413; one on either side of the aircraft. The holes 415a, 415b are the same as the hole 215 described above in relation to FIGS. 3a and 3b.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A refuel valve assembly for refuelling a first and a second fuel tank on an aircraft, wherein the refuel valve assembly comprises:
   an inlet for receiving fuel from an orifice in a structure of the aircraft,
   a first and a second outlet for delivering fuel from behind the structure to the first and second fuel tanks, and
   a refuel control apparatus for controlling fuel flow to the first and second outlets;
   wherein the refuel control apparatus comprises:
      a refuel computer; and
      a controllable valve assembly including at least one motor controlled valve connected to the refuel computer, said refuel computer configured to independently control delivery of fuel through the first outlet to said first fuel tank and delivery of fuel through the second outlet to said second fuel tank via real-time data.

2. A refuel valve assembly as claimed in claim 1, wherein the structure of the aircraft is a spar of the aircraft or a wing skin.

3. A refuel valve assembly as claimed in claim 1, wherein the controllable valve assembly comprises:
a first controllable valve for controlling fuel flow to the first outlet, and
a second controllable valve for controlling fuel flow to the second outlet;
wherein the first and second controllable valves are operable independently of each other.

4. A refuel valve assembly as claimed in claim 1, wherein the controllable valve assembly comprises a controllable valve with multiple ports that can be controlled to open and close access of fuel to at least two outlets.

5. A refuel valve assembly as claimed in claim 1, wherein said controllable valve assembly includes at least one controllable valve, said at least one controllable valve is rotatable such that ports of the valves can rotate to align with the refuel valve assembly outlets.

6. A refuel valve assembly as claimed in claim 1, wherein said controllable valve assembly includes at least one controllable valve, said at least one controllable valve is moveable to vary the degree of alignment of ports of the valves with the refuel valve assembly outlets.

7. A refuel valve assembly as claimed in claim 1, wherein said at least one motor controlled valve can be controlled based on real time refuel data.

8. A refuel valve assembly as claimed in claim 7, wherein each controllable valve is controlled by a different motor.

9. A refuel valve assembly as claimed in claim 7, wherein the motor is located on a motor drive head, in front of the refuel valve assembly inlet so that the motor is located in front of the structure.

10. A refuel valve assembly as claimed in claim 1, wherein the refuel control apparatus comprises a shut-off valve, said shut-off valve is moveable to close fuel access to the refuel valve assembly outlets independently of the controllable valve assembly.

11. A refuel valve assembly as claimed in claim 10, wherein the shut-off valve is in the form of a sleeve at least partially enclosing at least one controllable valve, wherein the sleeve is slideable with respect to the at least one controllable valve between an open position and a closed position.

12. A refuel valve assembly as claimed in claim 11, wherein the shut-off valve is biased towards the closed position so that in the absence of fuel flow through at least part of the refuel valve assembly, the shut-off valve closes.

13. A refuel valve assembly as claimed in claim 12, wherein when there is a loss of electrical power to the refuel valve assembly, fuel flow through at least part of the refuel valve assembly is prevented, such that the shut-off valve closes.

14. A refuel valve assembly as claimed in claim 13, wherein the shut-off valve can be moved into the open position to allow refuelling, in the absence of power, by activating a manual override apparatus.

15. A refuel valve assembly as claimed in claim 1, wherein the refuel valve assembly comprises a defuel inlet for receiving fuel, and wherein the controllable valve assembly comprises a controllable valve for controlling fuel flow through the defuel inlet to the refuel valve assembly, to allow defueling.

16. A refuel valve assembly as claimed in claim 15, wherein the controllable valve for controlling flow through the defuel inlet can also control flow through an outlet of the refuel valve assembly.

17. A refuel valve assembly as claimed in claim 15, wherein the refuel control apparatus comprises a shut-off valve, said shut-off valve is moveable to close fuel access to the refuel valve assembly outlets independently of the controllable valve assembly, and wherein the shut-off valve is also moveable to close fuel access to the refuel valve assembly from the defuel inlet independently of the controllable valve assembly.

18. A refuel valve assembly as claimed in claim 17, wherein the shut-off valve can be moved into the open position to allow defueling, in the absence of power, by activating a manual override apparatus.

19. A refuel valve assembly as claimed in claim 1, wherein the refuel valve assembly is mounted in a manifold shaft and wherein tank delivery lines are connectable to attachment points on the manifold shaft, the attachment points corresponding to the location of the outlets of the valve assembly.

20. A refuel valve assembly as claimed in claim 19, wherein the controllable valve assembly is contained within a casing in the manifold shaft and wherein the casing can be removed from the manifold shaft through the front of the structure orifice.

21. A refuel valve assembly as claimed in claim 1, wherein the refuel valve assembly is connected to two refuel couplings such that fuel delivered to either refuel coupling is supplied to an inlet of the refuel valve assembly.

22. A refuel structure comprising a refuel valve assembly of claim 1 and a plurality of tank delivery lines connected to the outlets of the refuel valve assembly.

23. A tank refuel system comprising the refuel structure according to claim 22 and a plurality of fuel tanks, each of said plurality of fuel tanks is attached to a different one of said plurality of tank delivery lines.

24. An aircraft comprising the refuel valve assembly as claimed in claim 1.

25. A method of refuelling a first and a second fuel tank on an aircraft, the method comprising the steps of:
delivering fuel to an orifice in a structure of the aircraft, then
receiving the fuel in an inlet of a refuel valve assembly behind the structure, and
operating a controllable valve assembly by means of a refuel computer to control fuel flow to a first and a second outlet of the refuel valve assembly,
so that delivery of fuel through the first outlet to the first fuel tank is controlled independently of delivery through the second outlet of fuel to the second fuel tank.

26. A refuel valve assembly for refuelling a first and a second fuel tank on an aircraft, wherein the refuel valve assembly comprises:
an inlet for receiving fuel from an orifice in a structure of the aircraft,
a first and a second outlet for delivering fuel from behind the structure to the first and second fuel tanks, and
a refuel control apparatus for controlling fuel flow to the first and second outlets;
wherein the refuel control apparatus comprises:
a refuel computer; and
a controllable valve assembly connected to the refuel computer, so that delivery of fuel through the first outlet to said first fuel tank is controlled independently of delivery through the second outlet of fuel to said second fuel tank, wherein the refuel valve assembly is mounted in a manifold shaft and wherein tank delivery lines are connectable to attachment points on the manifold shaft, the attachment points corresponding to the location of the outlets of the valve assembly, wherein the controllable valve assembly is contained within a casing in the manifold shaft and wherein the casing can be removed from the manifold shaft through the front of the structure orifice.

27. A refuel structure comprising a refuel valve assembly as claimed in claim 26 and a plurality of tank delivery lines connected to the outlets of the refuel valve assembly.

* * * * *